United States Patent

Funahashi et al.

[11] Patent Number: 6,075,655
[45] Date of Patent: Jun. 13, 2000

[54] OPTICAL MECHANISM WHICH ALLOWS PLAY BETWEEN TRANSMISSION MEMBERS FOR MOVING OPTICAL COMPONENTS

[75] Inventors: Akira Funahashi, Sakai; Junichi Tanii, Izumi, both of Japan

[73] Assignee: Minolta Co., Ltd., Osaka, Japan

[21] Appl. No.: 08/906,850

[22] Filed: Aug. 6, 1997

[30] Foreign Application Priority Data

Aug. 6, 1996 [JP] Japan ................................. 8-206912

[51] Int. Cl.⁷ ...................................................... G02B 15/14
[52] U.S. Cl. .......................................... 359/696; 359/698
[58] Field of Search ................................. 359/696–698, 359/822–824; 396/75–89

[56] References Cited

U.S. PATENT DOCUMENTS 5,592,250  1/1997  Shimizu ..................................... 396/79

FOREIGN PATENT DOCUMENTS 4-317015  11/1992  Japan .
5-72594   3/1993   Japan .
6-202213  7/1994   Japan .

Primary Examiner—Georgia Epps
Assistant Examiner—Michael A Lucas
Attorney, Agent, or Firm—Sidley & Austin

[57] ABSTRACT

A lens barrel has a focusing operation and a zooming operation which are carried out with only one driving source which is installed outside the lens barrel so as to realize a most suitable resolution for each of the operations. A rotary cylinder which supports a zooming frame which is axially movably therein, is connected to a linear-moving cylinder with a bayonet, which is axially movably supported inside a fixed cylinder. A focus rotation transmission key of a driving cylinder drives a lens frame which engages the zooming frame by a connecting helicoid. A zooming rotation transmission key of the driving cylinder engages an edge surface, forming a rotation transmission groove, of the rotary cylinder, with a play range. Upon rotation of the driving cylinder, only the lens frame is rotated to operate a focusing operation within the play range; however, the rotary cylinder is rotated to operate a zooming operation when the key contacts the edge surface of the rotary cylinder.

12 Claims, 12 Drawing Sheets

OPTICAL MECHANISM WHICH ALLOWS PLAY BETWEEN TRANSMISSION MEMBERS FOR MOVING OPTICAL COMPONENTS

FIELD OF THE INVENTION

The present invention relates to a zoom lens barrel and a zoom lens view finder for a zoom lens for a camera.

BACKGROUND OF THE INVENTION

In most conventional zoom lens barrels, such as those used for cameras, one driving motor is used to move a plurality of lenses to change a focal length during a zooming operation, and another driving motor is used to move a part of the lenses to adjust the focus during a focusing operation. In order to manufacture a compact camera at a low cost, it is preferable to use only one motor to perform both the zooming and focusing operations, and some kinds of zoom lens barrels, which allow zooming and focusing operations to be accomplished by only one motor have been proposed.

Referring to FIG. 9, illustrating a lens barrel 1a, which is disclosed in Japanese Laid-Open Patent Publication No. 6-202213, a driving motor 6 and a rotation-transmission gear train 7 are provided inside the lens barrel 1a. The rotation-transmission gear train 7 serves as a mechanism for switching the rotation of the driving motor to transmit the driving force thereof to either a zooming mechanism or a focusing mechanism. The lens barrel 1a is required to be of a large size because it is necessary to accommodate the driving motor 6 and the rotation-transmission gear train 7 inside the lens barrel 1a.

On the other hand, the lens barrel 1b illustrated in FIG. 10 which is disclosed in Japanese Laid-Open Patent Publication No. 4-317015 is comparatively of a small size because a driving motor 6a is positioned outside the lens barrel 1b. The lens barrel 1b has a first driving ring 2 and a second driving ring 4 coaxially connected with each other in series with an idling range or a play which is provided therebetween. The first driving ring 2 has a cam groove 2a for moving move a first lens group 8, and the second driving ring 4 has a cam groove 4a for moving the second lens group 9, respectively. In the lens barrel 1b, a focusing operation is performed within the idling range in which the connection portion 2b of the driving ring 2 and the connection portion 4b of the driving ring 4 are not in contact with each other. That is, when the connection portion 2b of the driving ring 2 and the connection portion 4b of the driving ring 4 are within the idling range, the rotation of the driving motor 6a is transmitted to only the second driving ring 4, so as to move the second lens group 9, with the first driving ring 2 and the second lens group 8 remaining stationary.

When the second driving ring 4 is rotated more than a predetermined amount, and the connection portions 2b and 4b contact each other, i.e. when the first and second driving rings 2 and 4 are out of the idling range, the rotation of the driving motor 6 is transmitted from the second driving ring 4 to the first driving ring 2. Thus, the zooming operation is performed so that both lens groups 8 and 9 move along the cam grooves 2a and 4a at the same time, respectively.

In other words, according to this latter conventional mechanism, the focusing operation is performed when the first and second driving rings 2 and 4 are within the idling range, whereas the zooming operation is performed when the first and second driving rings 2 and 4 are out of the idling range.

According to this latter conventional mechanism, because the second lens group 9 moves along the cam groove 4a to perform both the focusing and zooming operations, the resolution and accuracy of the focusing operation are the same as the resolution and accuracy of the zooming operation.

As shown in FIG. 11, however, the movement amount of the second lens group 9 during the focusing operation is much smaller than that of the first and second lens groups 8 and 9 during the zooming operation. For example, the movement amount of the second lens group 9 during the focusing operation is less than $\frac{1}{3}$ of that of the first and second lens groups 8 and 9 during the zooming operation.

Generally, in order to realize a higher resolution during focusing, it is necessary to realize a higher accuracy during the focusing operation. However, if the cams are formed so as to ensure a predetermined amount of movement of the first and second lens groups 8 and 9 during the zooming operation, the shapes or configurations of the cams must be steep, which makes achieving higher resolution and accuracy in the focusing operation difficult.

SUMMARY OF THE INVENTION

Therefore, it is an object of the present invention to provide a compact zoom lens barrel in which a focusing operation and a zooming operation are independently performed with an optimum resolution and accuracy by a driving force from a single driving source positioned outside the zoom lens barrel, and to provide a compact optical mechanism in which a focusing operation and a zooming operation are independently performed with an optimum resolution and accuracy by a driving force from a single driving source.

In accomplishing this and other objects of the present invention, there is provided a zoom lens barrel which is characterized in that it comprises a zoom driving system including a focus driving system therein, wherein the zoom lens barrel is driven by drive transmission means which is connected to a driving source provided outside of the zoom lens barrel. The focus driving system is driven, without play in a driving transmission, by a driving force from the driving source, and the zoom driving system is driven, with the play of driving transmission, by the driving force from the driving source.

More specifically, the zoom lens barrel comprises a zoom driving system, which comprises a focus driving system having one or more lenses, including a first lens; one or more lenses, including a second lens; and which makes the focus driving system as a whole and the second lens move relative to each other for a zooming operation. The zoom lens barrel further comprises a first transmission mechanism which transmits a driving force from an outside driving source to the focus driving system; and a second transmission mechanism which allows a predetermined rotational play between the zoom driving system and the first transmission mechanism, and which allows the driving force of the first transmission mechanism to be transmitted to the zoom driving system when the rotational play is absorbed therebetween. Only the focus driving system is so driven by the driving force of the first transmission mechanism when the rotational play is not absorbed therebetween that the first lens is moved for a focusing operation. The zoom driving system is so driven by the driving force of the first transmission mechanism when the play is absorbed therebetween that the focus driving system as a whole and the second lens are moved for the zooming operation.

According to the mechanism, only the focus driving system is driven when there exists the predetermined rotational play or idling range therebetween; on the other hand, the zoom driving system is driven when there does not exist the predetermined idling range therebetween. When the zoom driving system is actuated, the entire focus driving system including a lens is moved along the optical axis to perform a zooming operation. In the mechanism, the focus driving system and the zoom driving system can be constituted so as to realize a full focusing resolution and accuracy while securing a displacement for zooming.

That is, according to the mechanism, the focus driving system is driven upon receipt of the driving force from the first transmission mechanism for performing the focusing operation, within the play range. Meanwhile, the zoom driving system is driven upon receipt of the driving force from the second transmission mechanism for performing the zooming operation, outside of the play range. With the latter condition, the zoom driving system axially displaces the entire focus driving system together with the second lens. In other words, both the first lens and the second lens are moved axially together. The resolution and accuracy in the focusing operation which is performed upon receipt of the driving force from the first transmission mechanism depend upon the construction of the focus driving system. On the other hand, the resolution and accuracy in the zooming operation which is performed upon receipt of the driving force from the second transmission mechanism depend on the construction of the zoom driving system. Therefore, according to the mechanism, it is possible to realize a high resolution and accuracy in the focusing operation while realizing a full displacement or movement of the first and second lenses in the zooming operation.

In the zoom lens barrel having the above construction, generally, the focusing operation is performed after the zooming operation. That is, first, the driving force from the external driving source is transmitted to the first transmission mechanism beyond the predetermined idling range or play, and then the driving force therefrom is transmitted to the zoom driving system via the second transmission mechanism to allow the zooming operation to be performed. Then, the external driving source is driven reversely within the predetermined idling range to drive the first transmission mechanism so that the focusing driving system is actuated to perform the focusing operation.

Consequently, the driving force from a single external driving source can be transmitted to the focus driving system and the zoom driving system, separately, to realize a high resolution and accuracy in each of the focusing operation and the zooming operation.

Preferably, the focus driving system further comprises a lens frame which holds the first lens therein and which is rotated by the first transmission mechanism; and a cylindrical zooming frame which holds the lens frame movably therein and which is moved for the zooming operation. The lens frame and the cylindrical zooming frame engage each other with a helicoid connection, and wherein the zooming frame of the focus driving system is rotated in a same rotational direction and with a same rotational amount as the lens frame thereof which is rotated by the first transmission mechanism when the driving force is transmitted from the first transmission mechanism to the zoom driving system via the second transmission mechanism.

In the mechanism, within the predetermined idling range in which the zoom driving system is not actuated, the lens frame of the focus driving system is rotated relative to the zooming frame, which is supported by the zoom driving system when the driving force is transmitted to the lens frame via the first transmission mechanism. Because the lens frame and the zooming frame are connected with each other by the helicoid connection the lens frame is moved axially forward and rearward to perform the focusing operation by the rotation of the lens frame relative to the zooming frame. On the other hand, beyond the predetermined idling range, the lens frame and the zooming frame of the focus driving system are not rotated relative to each other, and the lens frame is not moved relative to the zooming frame. This is because when the driving force is transmitted to the zoom driving system from the second transmission mechanism, the zoom driving system rotates the zooming frame of the focus driving system in the same direction and by the same amount of rotation as the direction and the amount of rotation of the lens frame which is rotated by the first transmission mechanism. Thus, the focus driving system is moved not to perform the focusing operation but to perform the zooming operation. Thus, by appropriately selecting the lead of the inner helicoid formed on the zooming frame and that of the outer helicoid formed on the lens frame, a high resolution in performing the focusing operation can be realized.

Preferably, the first lens is positioned on the side opposite to the side on which an object to be photographed is positioned, with respect to the second lens.

The arrangement allows the zoom lens barrel to be simple in construction. That is, the focus driving system including the first lens is positioned in the zoom lens barrel on a side of the camera body. Therefore, when the zoom lens barrel is moved forward, the first transmission mechanism is capable of transmitting the external driving force to the focus driving system over a short distance because the focus driving system is positioned in the vicinity of the camera body.

In the mechanism, a shutter mechanism can be provided on a side of an object to be photographed with respect to the first lens.

With the arrangement, because the shutter mechanism is remote from the focus driving system which is driven by the zoom driving system as a part thereof, it is easy to constitute the shutter mechanism so that the shutter mechanism is prevented from being rotated when the zoom driving system is driven. Because the shutter mechanism is not rotated, an electric cable, a flexible printed wiring board, etc. which are connected with a CPU and a power source positioned in the camera body can be prevented from being twisted. Further, it is unnecessary to transmit the driving force to the focus driving system and the zoom driving system through any arrangement which is not rotated or is stationary.

In the mechanism, the zoom driving system can comprise a finder driving transmission mechanism for transmitting a driving force to a finder mechanism when the zoom driving system is driven by the first transmission mechanism.

According to the arrangement, when the zoom driving system is driven, the finder driving transmission mechanism transmits the driving force to the finder unit or mechanism synchronously with the actuation or operation of the zoom driving system. Accordingly, synchronously with the zooming operation of the zoom lens barrel, the finder unit is capable of accomplishing the zooming operation thereof. At time of the focusing operation, the finder unit is not driven thereby.

According to the present invention, there is also provided an optical mechanism, comprising a motor; a first moving member which holds a first optical component thereby; a second moving member which holds a second optical component thereby; a first transmission member which is driven by a driving force from the motor; a second transmission member which engages the first transmission member with a predetermined play between the first transmission member and the second transmission member; a first moving mechanism which moves the first moving member along an optical axis by a relative movement between the first transmission member and the second transmission member when the play exists between the first transmission member and the second transmission member; and a second moving mechanism which moves the first moving member and the second moving member together along the optical axis when the second transmission member is driven by the first transmission member when the play does not exist therebetween.

In the mechanism, the first moving mechanism can be moved together with the first moving member through the second moving mechanism.

In the mechanism, a displacement of the first moving member along the optical axis through the first moving mechanism for a constant rotational amount of the motor can be different from a displacement of the first moving member along the optical axis through the second moving mechanism for the constant rotational amount thereof.

According to the present invention, there is also provided a view finder unit or mechanism used for the zoom lens barrel, accommodating a zoom lens therein, of the present invention. The view finder unit is not limited to applying to the zoom lens barrel of the present invention, and the view finder unit may be used for any conventional zoom lens barrel.

The view finder unit for the zoom lens comprises a drive transmission mechanism which is driven by a zoom driving system for driving the zoom lens. The drive transmission mechanism transmits a driving force from the zoom driving system to a finder zoom driving system for driving the finder unit or mechanism.

In the mechanism, when the zoom driving system is actuated, the zoom lens inside the zoom lens barrel is driven. At this time, the zoom driving system transmits the driving force to the drive transmission mechanism of the view finder unit. Consequently, the finder zoom driving system of the finder unit is driven by the drive transmission mechanism. That is, with the mechanism, the finder unit can be driven in unison with the drive or movement of the zoom lens while performing the zooming operation. This operation and function is realized without using an additional separate driving source, like an additional motor, dedicated to drive the view finder unit or mechanism.

In the construction, the driving force is transmitted to the view finder unit from the zoom driving system. Alternatively, the driving force may be transmitted to the view finder unit from something other than the zoom driving system.

The finder zoom driving system of the view finder unit is driven in unison with the driving of the zoom lens which is driven by the zoom driving system. The driving force of an external driving source is transmitted to a focusing driving system of the zoom lens barrel through a zoom lens driving transmission mechanism which is driven by the driving force, without a predetermined idling range or a play. Meanwhile, the driving force from the external driving source is transmitted to a zooming driving system of the zoom lens barrel through the zoom lens driving transmission mechanism, with a predetermined idling range or play.

With the construction, the driving force from the external driving source is transmitted to the finder zoom driving system of the view finder unit via the zoom driving system of the zoom lens barrel with the same predetermined idling range or play in driving transmission as that of the zoom lens driving transmission mechanism relative to the zoom driving system of the zoom lens barrel.

According to the arrangement, with the play between the zoom lens driving transmission mechanism and the zoom driving system in the zoom lens barrel, the driving force from the external driving source is transmitted to the finder zoom driving system to actuate the view finder unit or mechanism. Within the predetermined idling range or play, the zoom lens driving transmission mechanism does not transmit the driving force to the zoom driving system in the zoom lens barrel; thus, the driving force is not transmitted to the finder zoom driving system in the view finder unit. In other words, within the predetermined idling range or play, the zoom lens and the view finder unit are not driven. Beyond the predetermined idling range or play, the zoom lens driving transmission mechanism transmits the driving force to the zoom driving system, and the driving force is subsequently transmitted to the finder zoom driving system via the drive transmission mechanism. Thus, beyond the predetermined idling range or play, both the zoom lens and the finder unit are driven. Accordingly, the view finder unit can be driven in unison with the driving of the zoom lens at time of performing the zooming operation, without using a separate additional driving source dedicated to drive the view finder unit.

BRIEF DESCRIPTION OF THE DRAWINGS

This and other objects and features of the present invention will become clear from the following description taken in conjunction with the preferred embodiment thereof with reference to the accompanying drawings, in which.

DETAILED DESCRIPTION OF THE INVENTION

Figure 1:
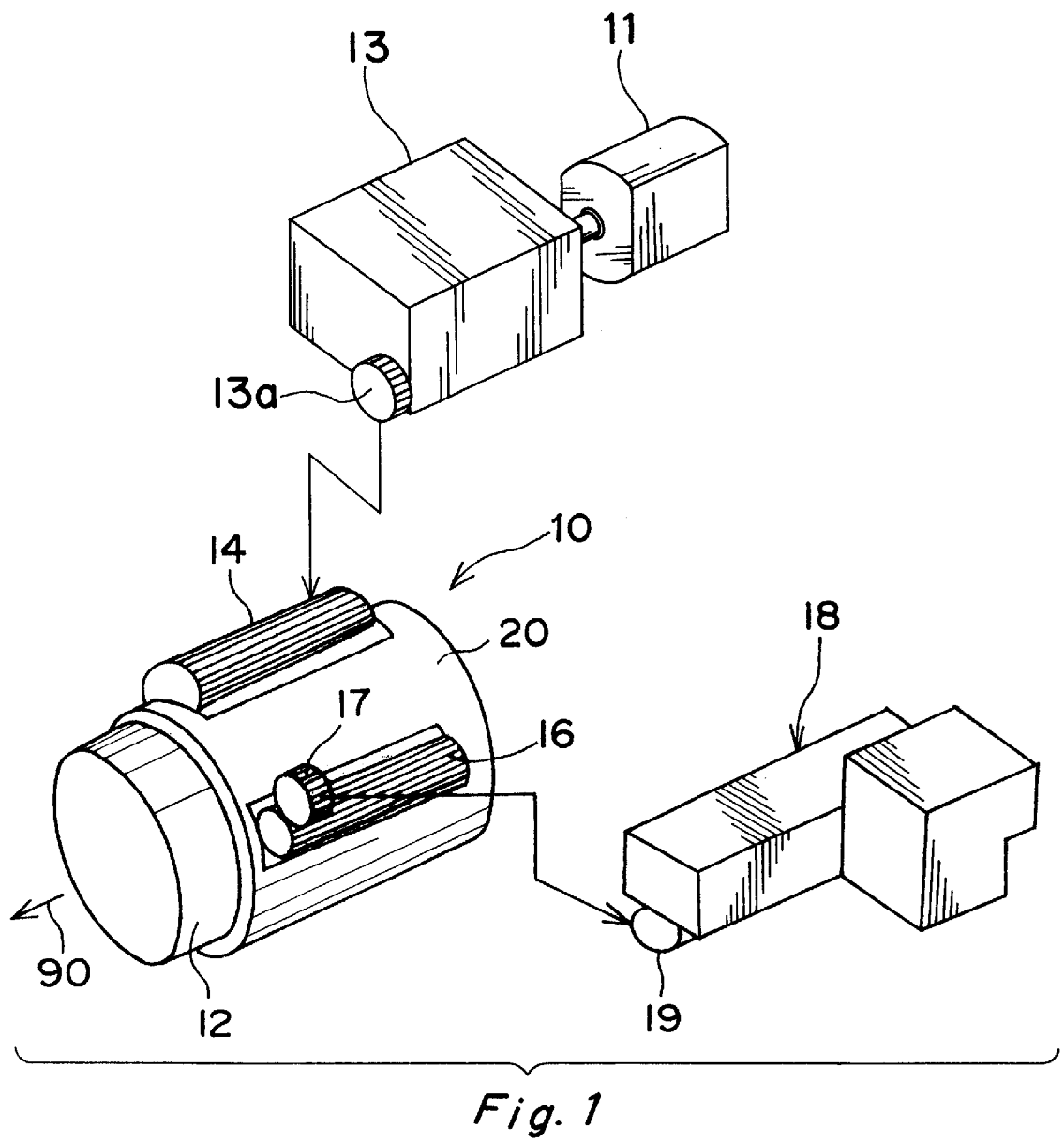
FIG. 1 is a perspective view showing a zoom lens barrel and a view finder unit, which are installed in a camera body, according to a first embodiment of the present invention.

It is to be noted that like or corresponding parts are designated by like reference numerals throughout the description and accompanying drawings.

Referring to FIGS. 1 through 8, and 12 through 17, a full description is made below of a zoom lens barrel, and a view finder for a zoom lens, according to a first, a second, and a third embodiment of the present invention.

First, referring to FIGS. 1 through 7, a description is made below of a zoom lens barrel 10 and a view finder unit or mechanism 18 for a zoom lens mounted in the zoom lens barrel 10, according to the first embodiment of the present invention.

The zoom lens barrel 10 is used in a compact camera of lens shutter type. As shown in FIG. 1, the zoom lens barrel 10 has a fixed cylinder 20 and a movable cylinder 12 accommodated inside the fixed cylinder 20. As shown in the figure, a rotation of a motor 11 is first transmitted to a rotational speed reduction system 13 where the rotation of the motor 11 is reduced, the rotational speed of which is outputted by an output gear 13a of the rotational speed reduction system 13. The output gear 13a engages a lens-driving long gear 14, so that the movable cylinder 12 is moved by a driving force from the motor 11 when the motor 11 operates.

Figure 2:
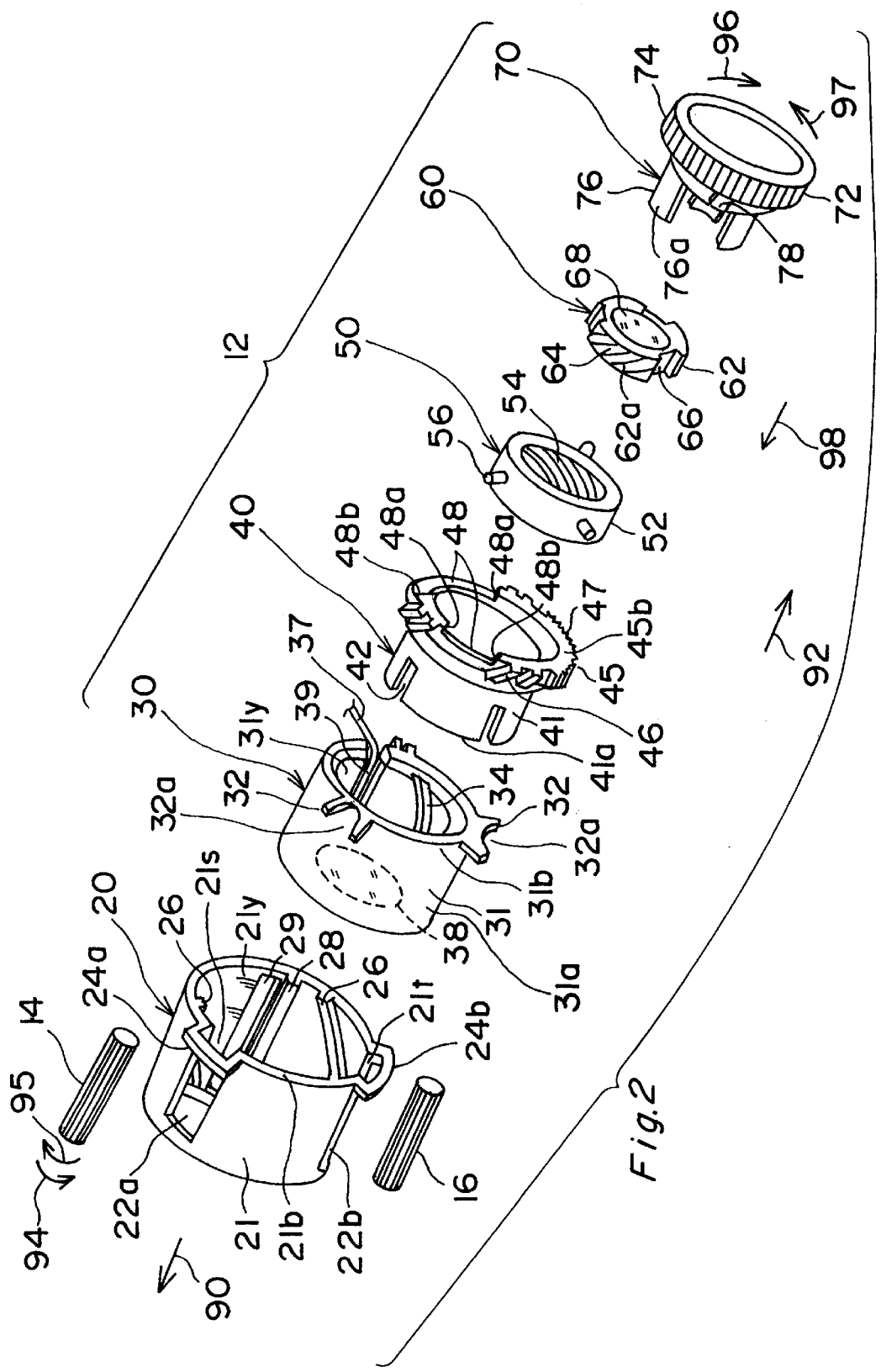
FIG. 2 is an exploded perspective view showing the zoom lens barrel shown in FIG. 1.

As shown in FIG. 2, the zoom lens barrel 10 is so constructed that upon rotation of a rotary cylinder 40, a linear-moving cylinder 30 and the rotary cylinder 40 are moved together forward relative to the fixed cylinder 20 so as to perform a zooming operation. As will be described later in detail, the rotation of the motor 11 which is transmitted to the movable cylinder 12, is transmitted to the finder unit 18 through a finder-driving long gear 16. With this construction, the size of an image in a view finder is changed, i.e. the finder unit 18 is zoomed, in unison with the zooming operation of the zoom lens barrel 10.

As shown in FIGS. 2 through 6, the fixed cylinder 20 has a cylindrical portion 21 which is fixed to an unshown fixing portion of a camera body in which the zoom lens barrel and the view finder are provided. As shown in FIG. 2, an axially-extending rectangular through-hole 29, for receiving an electrical lead, and a axially-extending pair of linear guide through-holes 22a and 22b are formed on the peripheral wall of the cylindrical portion 21 of the fixed cylinder 20. The rear end of each of the linear guide through-holes 22a and 22b reaches a rear end 21b of the cylindrical portion 21. That is, the linear guide through-holes 22a and 22b extend up to the end, of the cylindrical portion 21, opposite to the side (shown by an arrow 90) at which an object to be photographed is positioned. Openings 21s and 21t are formed at the rear end 21b of the cylindrical portion 21 in correspondence to each of the linear guide through-holes 22a and 22b. Guide through-hole bridges 24a and 24b project, radially outwardly from the rear end 21b of the cylindrical portion 21, at locations near the openings 21s and 21t. A linear key 28 extending axially along the rectangular through-hole 29 and three spiral leads 26 (one of the three leads 26 is not shown in FIG. 2) project inwardly from the inner peripheral surface 21y of the cylindrical portion 21. As best shown in FIG. 2, the lens-driving long gear 14 and the finder-driving long gear 16, the longitudinal axes of which are in parallel to the fixed cylinder 20 along the linear guide through-holes 22a and 22b, are rotatably mounted on the camera body or on the fixed cylinder 20 so that a part of the peripheral surface of the lens-driving long gear 14 and a part of the peripheral surface of the finder-driving long gear 16 are positioned inwardly relative to the inner peripheral surface 21y of the cylindrical portion 21.

Figure 4:
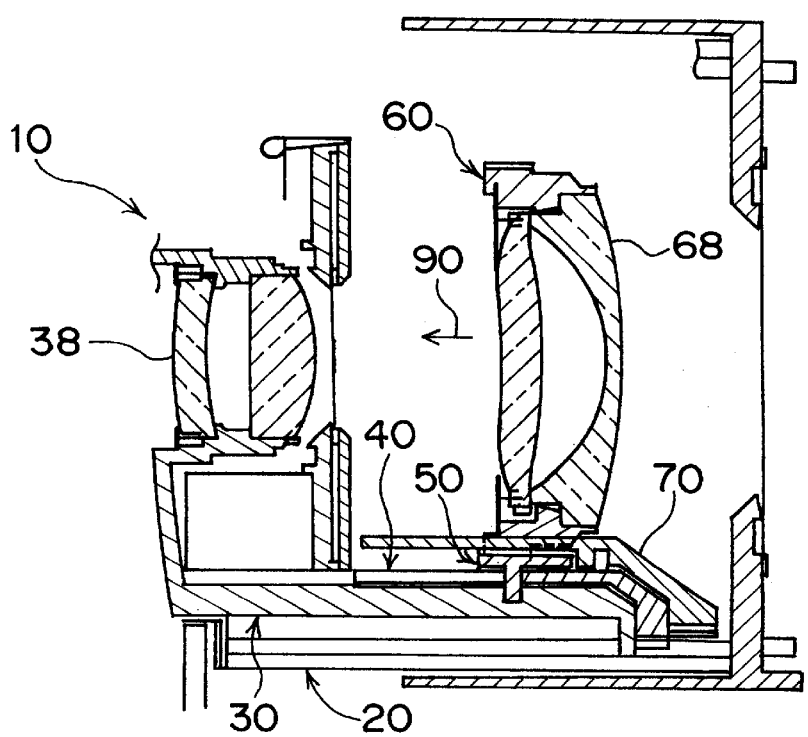
FIG. 4 is a longitudinal sectional view of the zoom lens barrel shown in FIG. 1, at time of moving the movable cylinder of the zoom lens barrel forward relative to the fixed cylinder thereof.
Figure 5:
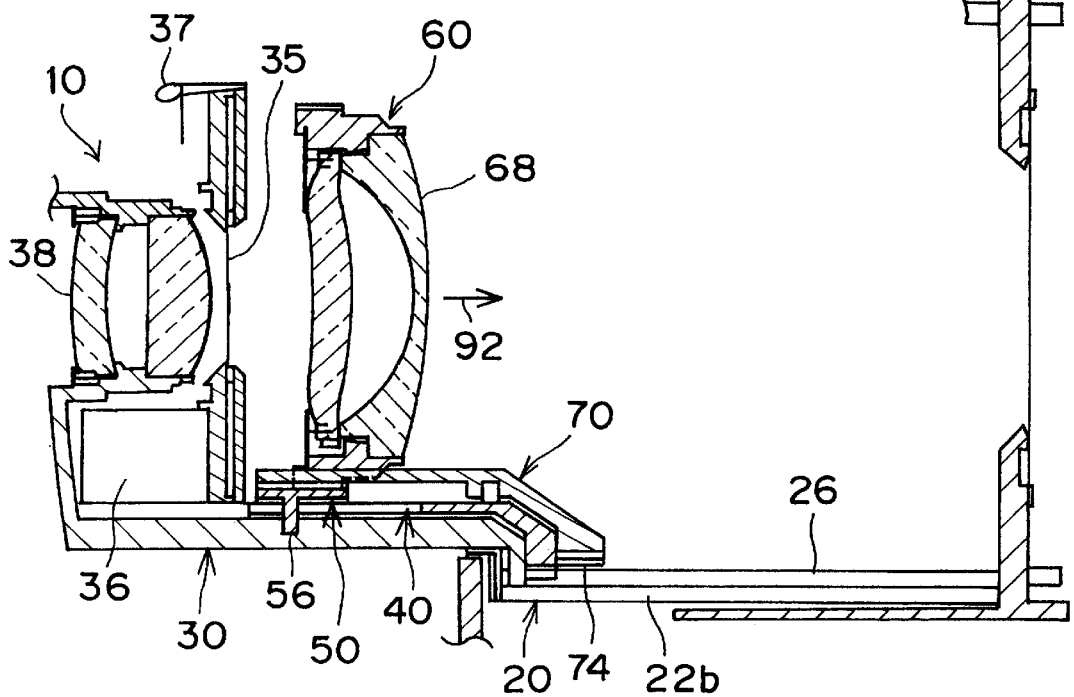
FIG. 5 is a longitudinal sectional view of the zoom lens barrel shown in FIG. 1, at time of moving the movable cylinder of the zoom lens barrel backward relative to the fixed cylinder thereof.
Figure 6:
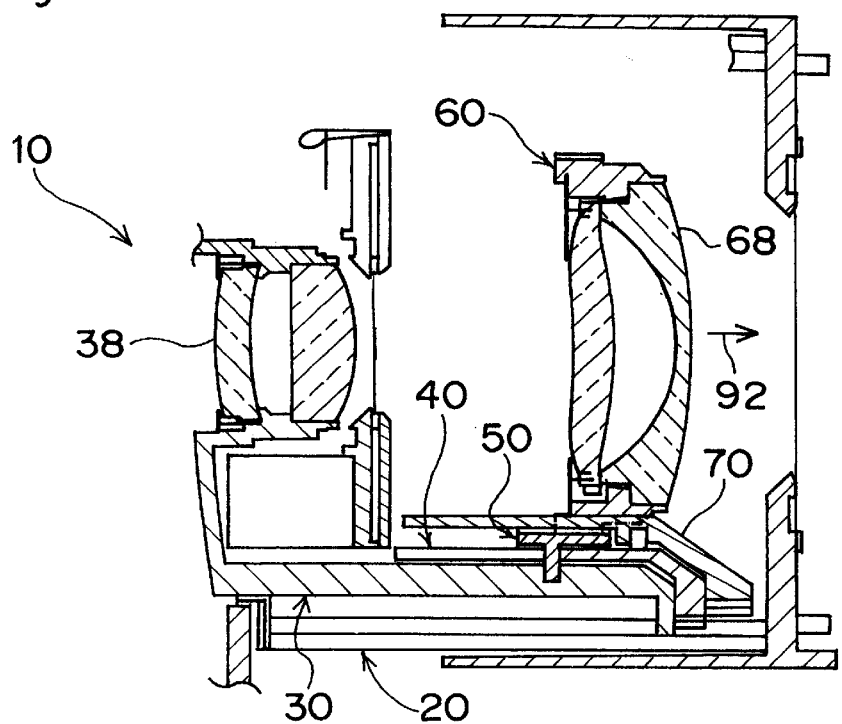
FIG. 6 is a longitudinal sectional view of the zoom lens barrel shown in FIG. 1, at time of moving the movable cylinder of the zoom lens barrel backward relative to the fixed cylinder thereof.

As shown in FIGS. 2, 5, and 6, the movable cylinder 12 comprises the linear-moving cylinder 30, the rotary cylinder 40, a second component zooming frame 50, a second lens frame 60, and a driving cylinder 70. As shown in FIGS. 3 through 6, the movable cylinder 12 is assembled by inserting these members forward into the fixed cylinder 20 from the rear end 21b of the fixed cylinder 20 in the above-described order. As will be described later, the second component zooming frame 50 is inserted rearward into the rotary cylinder 40 from the front end 41a of the cylindrical portion 41 thereof.

The linear-moving cylinder 30 has a cylindrical portion 31, which may be approximately cylindrical, is inserted into the cylindrical portion 21, with the cylindrical portion 31 being proximate to the inner peripheral surface of the cylindrical portion 21 of the fixed cylinder 20. Two engaging projections 32 for guiding the linear-moving cylinder 30 linearly axially with respect to the fixed cylinder 20 (hereinafter, the engaging projections are referred to as engaging projections 32) project radially outwardly from the rear end 31b of the cylindrical portion 31. Each of the engaging projections 32 moves axially in sliding contact with each of the linear guide through-holes 22a and 22b. Each of the engaging projections 32 has a U-shaped cut-out 32a formed between the two projections. The U-shaped cut-out 32a of the engaging projections 32 serves as a long gear relief portion so that the cut-out 32a does not interfere with the lens-driving long gear 14 and the finder-driving long gear 16.

The cylindrical portion 31 accommodates a first lens group 38 which is fixed at its front end 31a. Referring to FIGS. 3 through 6, a shutter 35 and a shutter driving unit 36 are provided at positions adjacent to the first lens group 38. Referring to FIG. 2, three second component zoom cam grooves 34 having respective bottoms, and a lead wire relief groove 39 having a bottom, are formed on the inner peripheral surface 31y of the cylindrical portion 31 so that the second component zoom cam groove 34 and the lead wire relief groove 39 are rearward from the shutter 35 and the shutter driving unit 36.

A lead wire 37 or a flexible wiring board, one end of which is connected with the shutter-driving unit 36 mounted in the linear-moving cylinder 30, is accommodated in the lead wire relief groove 39 of the linear-moving cylinder 30. Through the through-hole 29 of the fixed cylinder 20, the lead wire 37 is connected with a CPU 80 which will be described later and an unshown power source, both CPU 80 and power source being positioned on a side of the camera body.

The rotary cylinder 40 has the cylindrical portion 41 which is inserted into the cylindrical portion 31 of the linear-moving cylinder 30, with the cylindrical portion 41 being proximate to the inner peripheral surface of the cylindrical portion 31 and with a flange 45 extending radially outwardly from the rear end of the cylindrical portion 41. The rotary cylinder 40 is connected with the linear-moving cylinder 30 by means of an unshown bayonet so that the rotary cylinder 40 is unmovable axially relative to the linear-moving cylinder 30 and rotatable relatively thereto. Three zooming rotation transmission holes 42 (one of the three zooming rotation transmission holes 42 is unshown) extend axially rearward from the front end 41a of the cylindrical portion 41. The flange 45 is accommodated inside the cylindrical portion 21 of the fixed cylinder 20. Three lead connection portions 46 and a finder-interlocked gear 47 are formed on the peripheral surface of the flange 45. The diameter of the lead connection portions 46 and that of the finder-interlocked gear 47 are generally equal to each other. The finder-driving long gear 16 which is inserted into the guide hole 22b of the fixed cylinder 20, engages the finder-interlocked gear 47 of the rotary cylinder 40.

As shown in FIG. 1, an interlocking gear 17 which is connected with a finder zoom cam 19 of the finder unit 18, engages the finder-driving long gear 16 so that the size of the visual field in the finder is adjusted in unison with the operation of the zoom lens barrel 10. The interlocking gear 17 constitutes the drive transmission means for transmitting the rotation of the motor 11 to the finder unit 18. The rotary cylinder 40 moves axially when the rotary cylinder 40 rotates relative to the fixed cylinder 20, with the lead connection portions 46 of the rotary cylinder 40 being in engagement with the leads 26 formed on the inner peripheral surface 21y of the cylindrical portion 21 of the fixed cylinder 20. At this time, the finder-interlocked gear 47 moves forward between the pair of leads 26 of the fixed cylinder 20 while the finder-interlocked gear 47 is rotating relative thereto. Thus, the finder-interlocked gear 47 does not interfere with the leads 26. The rotary cylinder 40 rotates in a range of about 100° so that the rotary cylinder 40 moves between a wide-end (i.e. an end position in wide mode) and a tele-end (i.e. an end position in tele-mode). Two idling grooves 48 are circumferentially formed on a rear end surface 45b of the flange 45 so that each of the idling grooves 48 extend with a predetermined angle relative to an axis of rotation of the rotary cylinder 40.

The second component zooming frame 50 has an approximately donut-shaped body 52 and three cam pins 56 projecting radially outwardly from the peripheral surface of the body 52. A focusing inner helicoid 54 is formed on the inner peripheral surface of the body 52. When the second component zooming frame 50 is inserted rearward into the rotary cylinder 40 from the front end 41a thereof, each cam pin 56 engages into the corresponding zooming rotation transmission hole 42 of the rotary cylinder 40, and each cam pin 56 then engages into the corresponding second component zoom cam groove 34 formed on the inner peripheral surface 31y of the cylindrical portion 31 of the linear-moving cylinder 30.

The second lens frame 60 has a body 62 which is approximately cylindrical and which supports a second lens group 68. A focusing outer helicoid 64 is formed on the outer peripheral surface of the body 62. The focusing outer helicoid 64 engages the inner focusing helicoid 54 formed on the inner peripheral surface of the body 52 of the second component zooming frame 50 so that the second lens frame 60 is connected with the second component zooming frame 50 through the inner focusing helicoid 54 and the focusing outer helicoid 64. Three focus rotation transmission groove 66 extending axially are formed on the peripheral surface of the body 62 of the second component zooming frame 60.

The driving cylinder 70 comprises a cylindrical portion 72 which is inserted into the fixed cylinder 20 by positioning it inside the cylindrical portion 21 thereof, with the cylindrical portion 72 being proximate to the inner peripheral surface of the cylindrical portion 21; three focus rotation transmission keys 76 projecting forward (in a direction shown by an arrow 90) from the cylindrical portion 72; and two zooming rotation transmission keys 78. A driving gear 74 is formed on the entire peripheral outer surface of the cylindrical portion 72 so that the driving gear 74 engages the lens-driving long gear 14. The diameter of the driving gear 74 is almost equal to that of the finder-interlocked gear 47, is greater than the linear-moving cylinder 30, and is smaller than the diameter of the leads 26 of the fixed cylinder 20. Therefore, the lens-driving long gear 14 does not interfere with the peripheral surface of the linear-moving cylinder 30, and the driving gear 74 does not engage the finder-interlocked gear 47 or the leads 26.

The focus rotation transmission key 76 is provided radially inwardly from the zooming rotation transmission key 78 and is provided axially longer than the zooming rotation transmission key 78. The zooming rotation transmission key 78 is inserted into the idling groove 48 of the rotary cylinder 40. The driving cylinder 70 is connected with the rotary cylinder 40, with a predetermined rotary idling angle provided between the driving cylinder 70 and the rotary cylinder 40. The focus rotation transmission key 76 slides axially in contact with the focus rotation transmission groove 66 of the second lens frame 60, and the peripheral surface 76a of the focus rotation transmission key 76 is positioned radially inwardly from the peripheral surface 62a of the body 62 of the second lens frame 60 so that the second lens frame 60 is axially movable while rotating relative to the second component zooming frame 50. An unshown bayonet is formed on the cylindrical portion 72 of the driving cylinder 70 at a predetermined location thereof to connect the driving cylinder 70 to the rotary cylinder 40 by the bayonet, so that the driving cylinder 70 and the rotary cylinder 40 are axially unmovable relative to each other and rotatable relatively to each other.

Next, the operation of the zoom lens barrel 10 having the above construction is described below.

When the lens-driving long gear 14 is driven counter-clockwise as shown by an arrow 94 in FIG. 2 by the driving motor 11 as shown in FIG. 1, the lens-driving long gear 14 rotates the driving gear 74 of the driving cylinder 70 clockwise as shown by an arrow 96 in FIG. 2. As a result of the rotation of the driving cylinder 70, the second lens frame 60 rotates because the focus rotation transmission key 76 of the driving cylinder 70 slides axially in contact with the focus rotation transmission groove 66 of the second lens frame 60. At this time, the zooming rotation transmission key 78 of the driving cylinder 70 also rotates, and the zooming rotation transmission key 78 thereof moves within the idling groove 48 of the rotary cylinder 40.

While the zooming rotation transmission key 78 of the driving cylinder 70 is moving along the idling groove 48 from an end surface 48b thereof to an end surface 48a thereof, the rotary cylinder 40 is not rotated. Thus, the linear-moving cylinder 30 is axially stationary relative to the fixed cylinder 20, and hence the first lens group 38 remains stationary relative thereto.

At this time, the second component zooming frame 50 is not rotated relative to the fixed cylinder 20, because the cam pin 56 is in engagement with the zooming rotation transmission hole 42 of the rotary cylinder 40 which is not rotated and is stationary. But the second lens frame 60 rotates relative to the second component zooming frame 50 because the rotation of the driving cylinder 70 allows the second lens frame 60 to rotate relative thereto, as described above. The rotating second lens frame 60 moves forward axially, in a direction as shown by an arrow 98 in FIG. 2, relative to the second component zooming frame 50 which is currently stationary, because the focusing outer helicoid 64 of the second lens frame 60 and the inner focusing helicoid 54 of the second component zooming frame 50 are in engagement with each other.

Accordingly, in the idling interval, while the first lens group 38 is stationary, the second lens group 68 is moved axially to perform the focusing operation.

When the zooming rotation transmission key 78 of the driving cylinder 70 is rotated further and when the key 78 reaches and contacts the terminal end surface 48a as mentioned above of the idling groove 48 of the rotary cylinder 40, the zooming rotation transmission key 78 presses or biases the terminal end surface 48a of the idling groove 48, thus rotating the rotary cylinder 40 clockwise as shown by the arrow 96, relative to the fixed cylinder 20.

Upon the start of rotation of the rotary cylinder 40 relative to the fixed cylinder 20, the rotary cylinder 40 moves forward axially along the lead 26 in a direction as shown by the arrow 90, because the lead connection portion 46 of the flange 45 of the rotary cylinder 40 is in engagement with the lead 26 formed on the inner peripheral surface 21y of the cylindrical portion 21. Because the linear-moving cylinder 30 is rotationally connected with the rotary cylinder 40 by the unshown bayonet, and because the engaging projections 32 projecting from the cylindrical portion 31 of the linear-moving cylinder 30 moves forward along the linear guide through-holes 22a and 22b of the fixed cylinder 20, the linear-moving cylinder 30 moves axially forward together with the rotary cylinder 40 without the linear-moving cylinder 30 being rotated. As a result, the first lens group 38 which is supported by the linear-moving cylinder 30 moves axially forward together with the linear-moving cylinder 30.

At this time, the rotating driving cylinder 70 also moves axially forward together with the linear-moving cylinder 30 and together with the rotary cylinder 40, relative to the fixed cylinder 20, because the driving cylinder 70 is connected with the rotary cylinder 40, with the driving cylinder 70 being axially unmovable relative to the rotary cylinder 40, as mentioned above.

The second component zooming frame 50 moves axially, relative to the linear-moving cylinder 30 which also moves axially relative to the fixed cylinder 20, due to the rotation of the rotary cylinder 40 relative to the linear-moving cylinder 30, with the cam pin 56 engaging both the zooming rotation transmission hole 42 and the second component zoom cam groove 34. At this time, the second component zooming frame 50 rotates together with the rotary cylinder 40 and the driving cylinder 70, because the cam pin 56 thereof is in engagement with the zooming rotation transmission hole 42 of the rotary cylinder 40, and because the driving cylinder 70 rotates together with the rotary cylinder 40, with the key 78 of the driving cylinder 70 engaging with the terminal end surface 48a of the idling groove 48 of the rotary cylinder 40.

At this time, the second lens frame 60 accommodated inside the second component zooming frame 50 rotates together with the driving cylinder 70, the second component zooming frame 50 and the rotary cylinder 40, relative to the linear-moving cylinder 30 or to the fixed cylinder 20. Because the second component zooming frame 50 and the second lens frame 60 rotate together and do not rotate relative to each other, they do not move axially relative to each other. Accordingly, the second lens group 68 supported by the second lens frame 60 does not move axially relative to the second component zooming frame 50; however, both the second lens group 68 and the second lens frame 60 move axially together at the same time.

Thus, after the zooming rotation transmission key 78 passes through the idling interval, the first lens group 38 and the second lens group 68 are moved together and moved axially to perform the zooming operation. At this time, the second lens group 68 is at the most forward position relative to the second component zooming frame 50.

Figure 3:
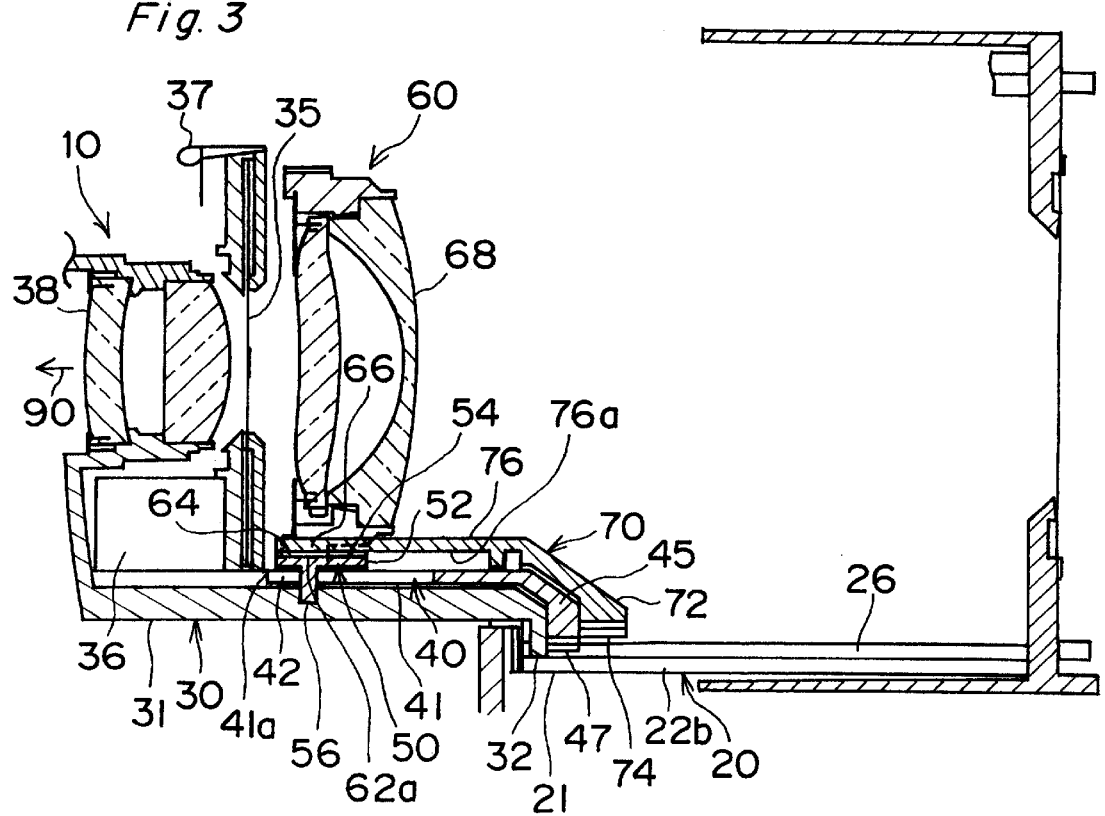
FIG. 3 is a longitudinal sectional view of the zoom lens barrel shown in FIG. 1, at time of moving a movable cylinder of the zoom lens barrel forward relative to a fixed cylinder thereof.

As a result of the rotation of the zoom lens barrel 10, the movable cylinder 12 is moved forward from the fixed cylinder 20, as shown by the arrow 90; and the position of the zoom lens barrel 10 is switched from the end position in the wide mode (i.e. wide-end) as shown in FIG. 4 to the end position in the telescopic mode (i.e. tele-mode) as shown in FIG. 3.

On the other hand, upon rotating the driving motor in a reverse direction, the second lens group 68 moves rearward axially as shown by an arrow 92, with the first lens group 38 being stationary. As a result, the position of the zoom lens barrel 10 is switched from the end position in the telescopic mode as shown in FIG. 5 to the end position in the wide mode as shown in FIG. 6.

That is, as shown in FIG. 2, when the driving motor rotates reversely in this way, the lens-driving long gear 14 rotates clockwise as shown by the arrow 95, and the driving cylinder 70 rotates counterclockwise as shown by an arrow 97 in the figure. As a result, the zooming rotation transmission key 78 of the driving cylinder 70 moves away from the terminal end surface 48a of the idling groove 48 of the rotary cylinder 40, to the initial end surface 48b opposed to the terminal end surface 48a. That is, the zooming rotation transmission key 78 moves reversely in the idling interval. At this time, because the rotation of the driving cylinder 70 is not transmitted to the rotary cylinder 40, the linear-moving cylinder 30, the rotary cylinder 40, and the second component zooming frame 50 are stationary relative to the fixed cylinder 20, while the second lens frame 60 rotates counterclockwise together with the driving cylinder 70 as shown by the arrow 97. Thus, as shown by the arrow 92, the second lens frame 60 moves axially rearward relative to the second component zooming frame 50 which is currently stationary, with the outer helicoid 64 of the second lens frame 60 engaging the inner helicoid 54 of the second component zooming frame 50.

As a result of further reverse rotation of the driving motor, the zooming rotation transmission key 78 of the driving cylinder 70 contacts the initial end surface 48b of the idling groove 48 of the rotary cylinder 40, thus rotating the rotary cylinder 40, and the second component zooming frame 50. Consequently, the movable cylinder 12 is entirely moved rearward into the fixed cylinder 20, thus arriving at the end position in the wide mode as shown in FIG. 6. At this time, the second lens frame 60 is moved together with the second component zooming frame 50, and the second lens frame 60 reaches the rearmost position relative to the second component zooming frame 50.

After the lens is moved rearward into the fixed cylinder 20, and after the reverse rotation of the driving motor 11 is stopped, the motor is rotated forward a predetermined amount so as to remove a backlash of the zoom lens barrel 10 like a condition in which the backlash is removed when the motor is stopped after the lens is moved forward. That is, the driving motor is rotated reversely until the linear-moving cylinder 30, the rotary cylinder 40, and the second component zooming frame 50 start to rotate relative to the fixed cylinder 20 when the second lens frame 60 is positioned at the most forward position relative to the second component zooming frame 50, as shown in FIG. 4, and then the motor 11 is stopped.

When the zooming operation is performed, the rotary cylinder 40 rotates and thereby the finder-driving long gear 16 is rotated. Because the interlocking gear 17 as shown in FIG. 1 of the finder unit 18 is in engagement with the finder-driving long gear 16, the rotation of the rotary cylinder 40 is transmitted to the interlocking gear 17 of the finder unit 18 when the zooming operation is performed. Accordingly, the finder unit 18 is driven by the rotation to execute the zooming operation in unison with the zooming operation of the zoom lens barrel 10, without using a separate driving source for driving the finder unit 18.

Next, the controlling of the zoom lens barrel 10 is described below.

Figure 7:
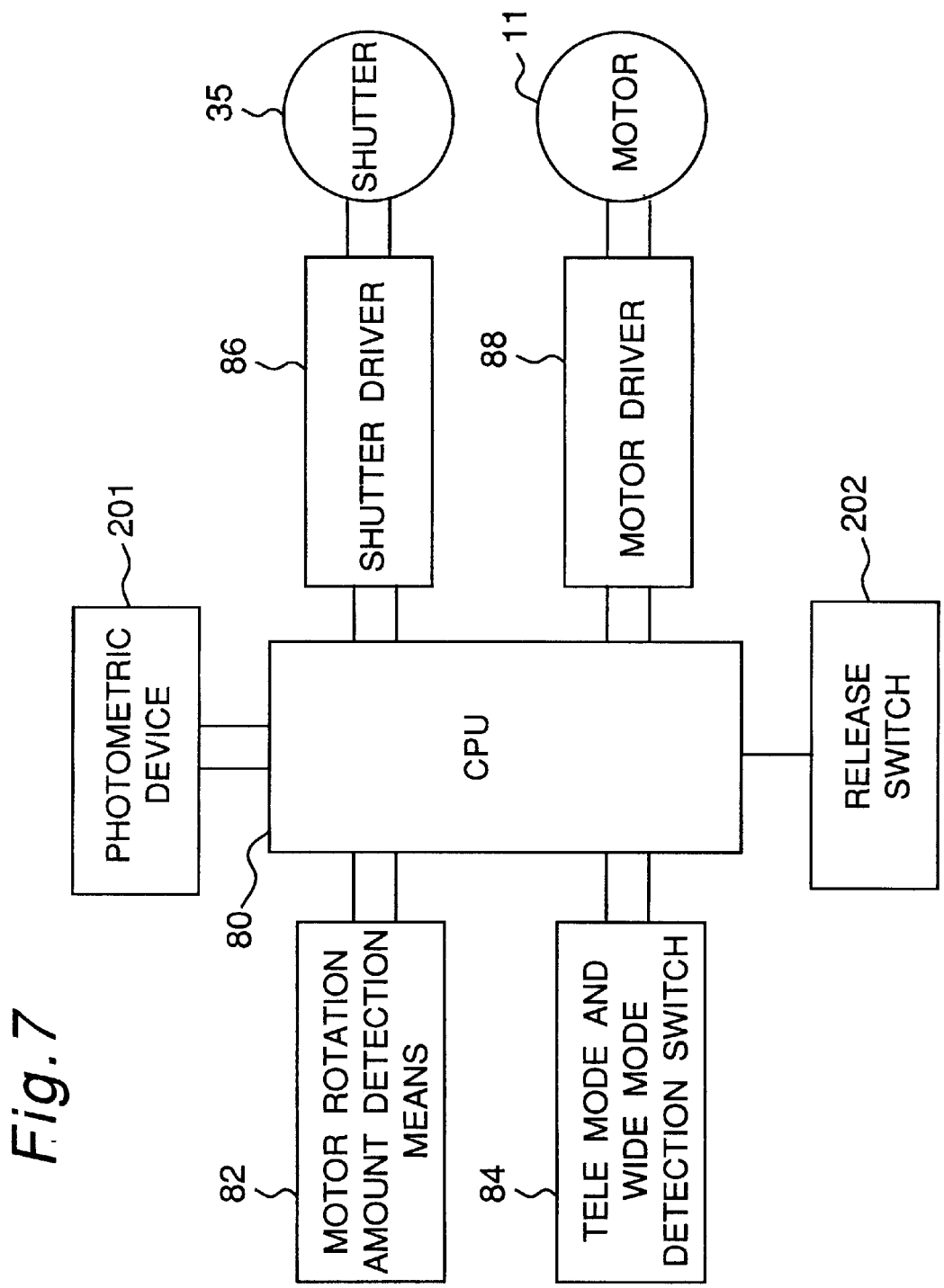
FIG. 7 is a block diagram showing a control circuit for controlling the zoom lens barrel shown in FIG. 1.

The zoom lens barrel 10 is controlled by the control circuit shown in FIG. 7. That is, a CPU 80 is electrically connected to a detection means 82 (hereinafter, referred to as detection means 82), constituted by an encoder for example, for detecting the rotational amount of the motor, a tele-mode and wide-mode detection switch 84, a shutter driver 86 for driving the shutter 35, and a motor driver 88 for driving the motor 11.

Although not shown in FIGS. 2 through 6, in addition to the electrical devices or components directly connected with the zoom lens barrel 10, the CPU 80 is also electrically connected with a release switch 202 and a photometric device 201, as in an ordinary camera.

When the tele-mode and wide-mode detection switch 84 is actuated, a signal is transmitted to the CPU 80 from the switch 84. As a result, the CPU 80 transmits a control signal to the motor driver 88 according to whether the photographic mode is in the tele-mode or the wide-mode. According to whether the photographic mode is in the tele mode or the wide mode, the motor 89 is driven forwardly or reversely by the motor driver 88.

For example, in case that the tele-mode and wide-mode operation lever is pushed to a position corresponding to the tele-mode, the lever is returned to an intermediate position, and the signal outputted from the tele-mode and wide-mode detection switch 84 is not transmitted to the CPU 80, then, the CPU 80 transmits a stop control signal to the motor driver 88 to stop the motor 89 from rotating forward.

On the other hand, in case that the tele mode and wide mode operation lever is pushed to a position of the wide mode, the lever is returned to the intermediate position, and the signal outputted from the tele-mode and wide-mode detection switch 84 is not transmitted to the CPU 80, then, the CPU 80 transmits a forward rotation control signal to the motor driver 88 to rotate the motor 89, which is rotating reversely, forward. The CPU monitors a signal outputted from the detection means 82. When the CPU 80 decides from the signal that an amount of forward rotation of the motor 11 exceeds a predetermined amount corresponding to the idling interval, the CPU 80 transmits the stop control signal to the motor driver 88 for stopping the motor 11.

When the release switch 202 is half pressed, the CPU calculates the rotation amount of the motor 89, based on a datum of photographic distance outputted from the photometric device 201. Next, the CPU 80 transmits a control signal to the motor driver 88 to reverse rotation of the motor 89 up to the rotation amount of the motor thus calculated, while the CPU 80 is monitoring the signal outputted from the detection means 82.

When the release switch 202 is pressed fully, the CPU 80 transmits a control signal to the shutter driver 86 to operate the shutter 35.

According to the embodiment, only one driving motor 11 is used for accomplishing both the focusing and zooming operations. Because the driving motor 11 is installed outside the zoom lens barrel 10, the zoom lens barrel 10 can be prevented from being of a large size.

Also, according to the embodiment, it is possible to heighten only the resolution in the focusing operation, independently of the zooming operation, by appropriately selecting the leads of the inner helicoid 54 formed on the inner peripheral surface of the second component zooming frame 50 and of the focusing outer helicoid 64 formed on the peripheral surface of the second lens frame 60. For example, to heighten only the resolution in the focusing operation, can be realized by selecting the leads of the inner helicoid 54 thereof and the outer helicoid 64 thereof so that the feeding amount of the lens along the optical axis in the focusing operation is less than one third of that of the lens along the optical axis in the zooming operation, for the same amount of rotation of the motor 11.

Next, referring to FIG. 8, a description is made below of a zoom lens barrel 10a and a view finder unit or mechanism 18a for a zoom lens mounted in the zoom lens barrel 10a therein, according to the second embodiment of the present invention. Similar parts or components which correspond to those in the first embodiment, are designated by reference numerals with an alphabet "a" being suffixed thereto.

In the first embodiment, the rotation of the driving motor 11 is transmitted to the finder unit 18 through the rotary cylinder 40 of the zoom lens barrel 10. In this second embodiment which is described below, the rotation of the motor is transmitted to the finder unit not through the lens barrel.

Because the zoom lens barrel 10a of the second embodiment has a mechanism similar to that of the zoom lens barrel 10 of the first embodiment, the mechanisms or constructions different from those of the first embodiment are mainly described below with reference to FIG. 8.

Figure 8:
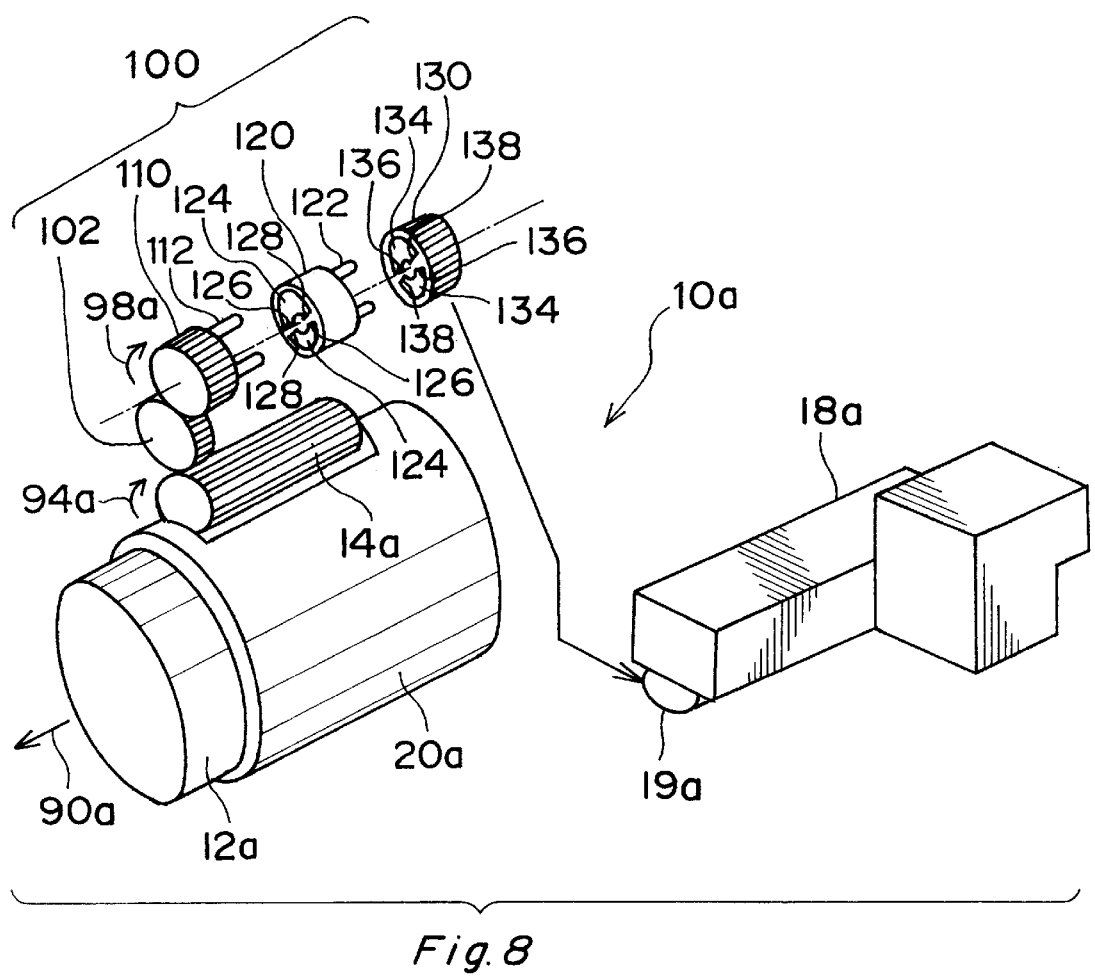
FIG. 8 is a perspective view showing a zoom lens barrel and a view finder unit, which are installed in a camera body, according to a second embodiment of the present invention.
Figure 9:
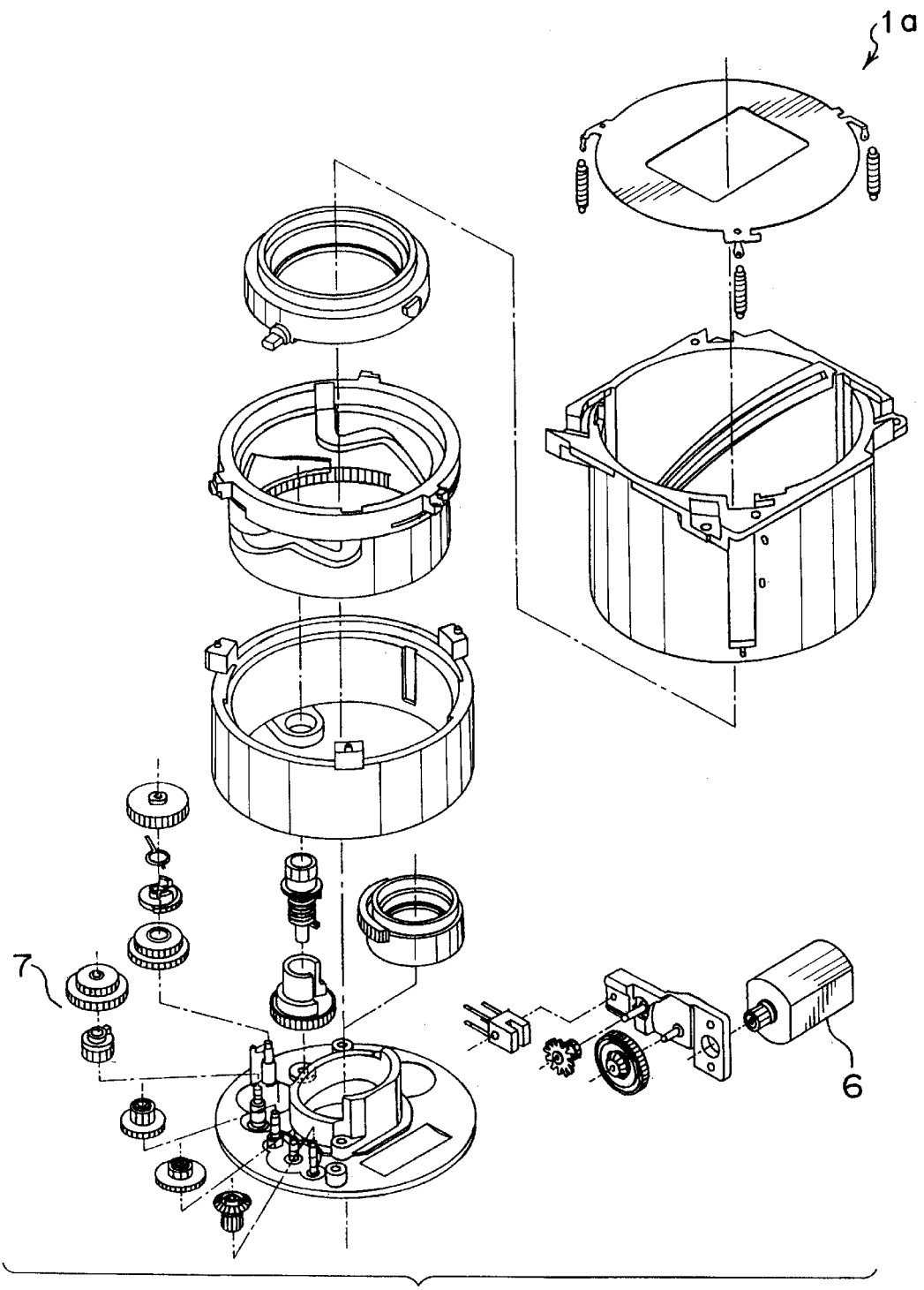
FIG. 9 is an exploded perspective view showing a conventional zoom lens barrel.
Figure 10:
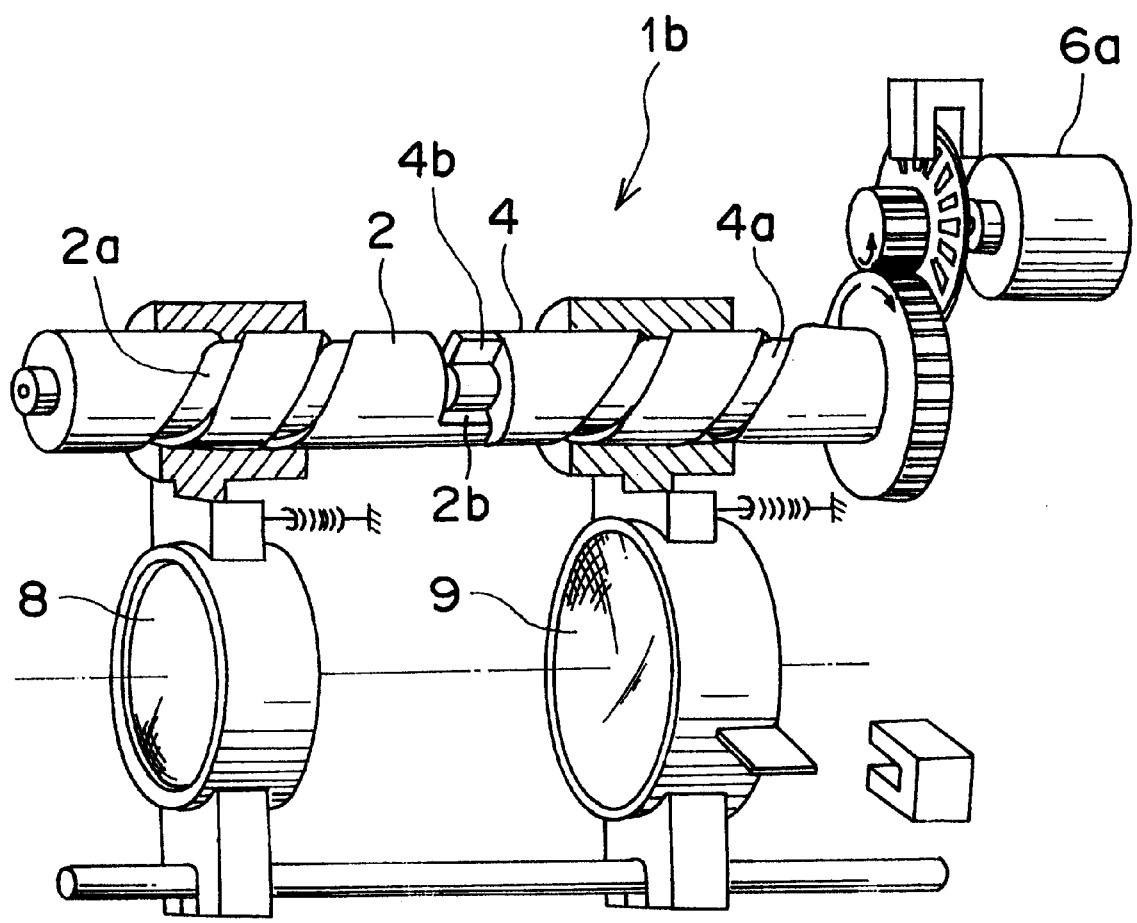
FIG. 10 is a perspective view showing another conventional zoom lens barrel.
Figure 11:
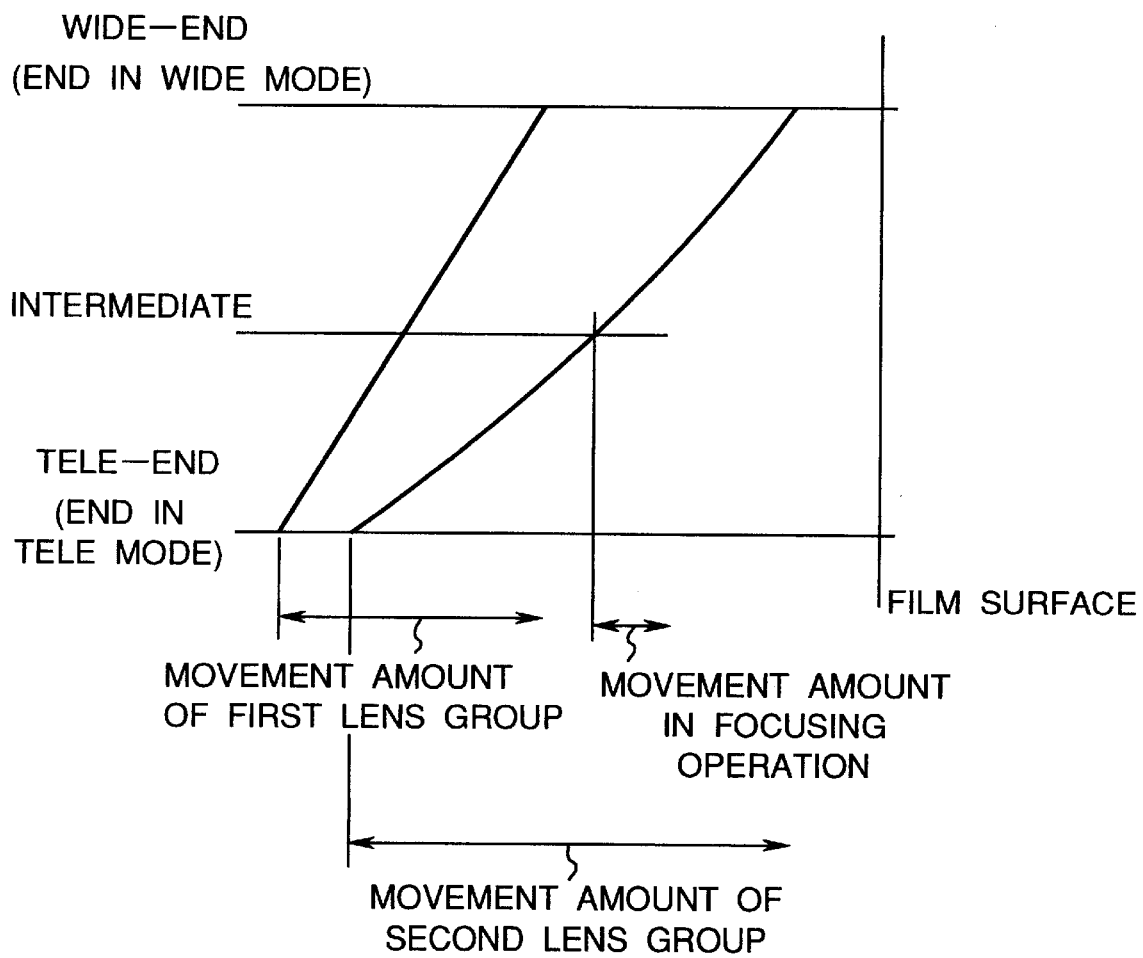
FIG. 11 is a cam curve diagram of the conventional zoom lens barrel shown in FIG. 10.

As shown in FIG. 8, there is provided a lens-driving long gear 14a which is inserted and mounted in a fixed cylinder 20a of the zoom lens barrel 10a comprises; and there is not provided a finder-driving long gear as provided in the first embodiment. Instead of the finder-driving long gear, there is provided a finder-driving mechanism 100 outside the zoom lens barrel 10a. The finder-driving mechanism 100 constitutes a mechanism for transmitting the rotation of a driving motor (not shown in the figure) to the finder unit 18a.

More specifically, the finder-driving mechanism 100 comprises a rotatable first gear 102 engaging the lens-driving long gear 14a; a rotatable second gear 110 engaging the first gear 102; a rotatable intermediate roller 120 coaxial with the second gear 110; and a rotatable third gear 130 adjacent to the intermediate roller 120, with the intermediate roller 120 being mounted between the second gear 110 and the third gear 130. The third gear 130 is connected with a finder cam 19a of the finder unit 18a. The second gear 110 has a pair of rotation transmission bars 112 which is symmetrical with respect to the axis of the second gear 110 and which is projecting axially toward the intermediate roller 120.

The intermediate roller 120 has a pair of fan-shaped differential grooves 124 each of which is formed in a general range of 180° on the surface thereof confronting the second gear 110. Each of the rotation transmission bars 112 of the second gear 110 is inserted into one of the differential grooves 124. Similarly to the rotation transmission bars 112 of the second gear 110, the intermediate roller 120 has a pair of rotation transmission bars 122 projecting axially toward the third gear 130 from the side opposite to the side having the differential grooves 124 formed thereon. Similarly to the differential grooves 124 of the intermediate roller 120, the third gear 130 has a pair of differential grooves 134 on the side confronting the intermediate roller 120. Each of the rotation transmission bars 122 of the intermediate roller 120 is inserted into one of the differential grooves 134 of the third gear 130.

In the aforementioned construction, a space corresponding to the play in which the rotation transmission bar 112 of the second gear 110 moves from one end surface 126 of the differential groove 124 to the other end surface 128 thereof, is an idling interval (idling field or idling region) in which the rotation of the second gear 110 is not transmitted to the intermediate roller 120.

Similarly, an idling interval is formed between the rotation transmission bar 122 of the intermediate roller 120 and the differential groove 134 of the third gear 130. The two idling intervals coincide with the idling interval of the zoom lens barrel 10a.

Namely, when the lens-driving long gear 14a is rotated clockwise as shown by an arrow 94a, the second gear 110 also rotates clockwise as shown by an arrow 98a through the first gear 102. As a result, the rotation transmission bar 112 having been in contact with the end surface 126 of the differential groove 124 of the intermediate roller 120 starts to rotate clockwise. Until the rotation transmission bar 112 reaches the other end surface 128 of the differential groove 124 of the intermediate roller 120, the intermediate roller 120 is not moved because the rotation of the second gear 110 is not transmitted to the intermediate roller 120.

After the rotation transmission bar 112 reaches the other end surface 128 of the differential groove 124, the rotation transmission bar 112 presses or biases the other end surface 128 thereof; therefore, the second gear 110 and the intermediate roller 120 rotate together in the same rotational direction.

When the intermediate roller 120 starts to rotate, the rotation transmission bar 122 also starts moving away from one end surface 136 of the differential groove 134, and starts moving toward the other end surface 138 thereof. Until the rotation transmission bar 122 reaches the other end surface 138 thereof, the third gear 130 is not moved because the rotation of the intermediate roller 120 is not transmitted to the third gear 130. After the rotation transmission bar 122 reaches the other end surface 138 thereof, the rotation transmission bar 122 presses or biases the other end surface 138 thereof. Thus, the third gear 130 and the intermediate roller 120 rotate together in the same rotational direction.

In the mechanism, the start of the rotation of the third gear 130 is synchronized with that of the rotation of the rotary cylinder, which corresponds to the rotary cylinder 40 in the first embodiment, of the zoom lens barrel 10a; namely, the start of the rotation of the third gear 130 is synchronized with the start of the zooming operation.

As described above, because the idling interval is provided between the second gear 110 and the intermediate roller 120, and is provided between the intermediate roller 120 and the third gear 130, the idling interval of the zoom lens barrel 10a is allowed to be coincident with that of the finder driving mechanism 100. Accordingly, the finder unit 18a can be driven in unison with the zooming operation of the zoom lens barrel 10a in performing the zooming operation, without using another driving motor or driving source for driving the finder unit 18a.

Next, referring to FIGS. 12 through 17, a description is made below of a zoom lens barrel 10b, to which a view finder unit or mechanism as described in the first and second embodiments applies, according to the third embodiment of the present invention.

Figure 12:
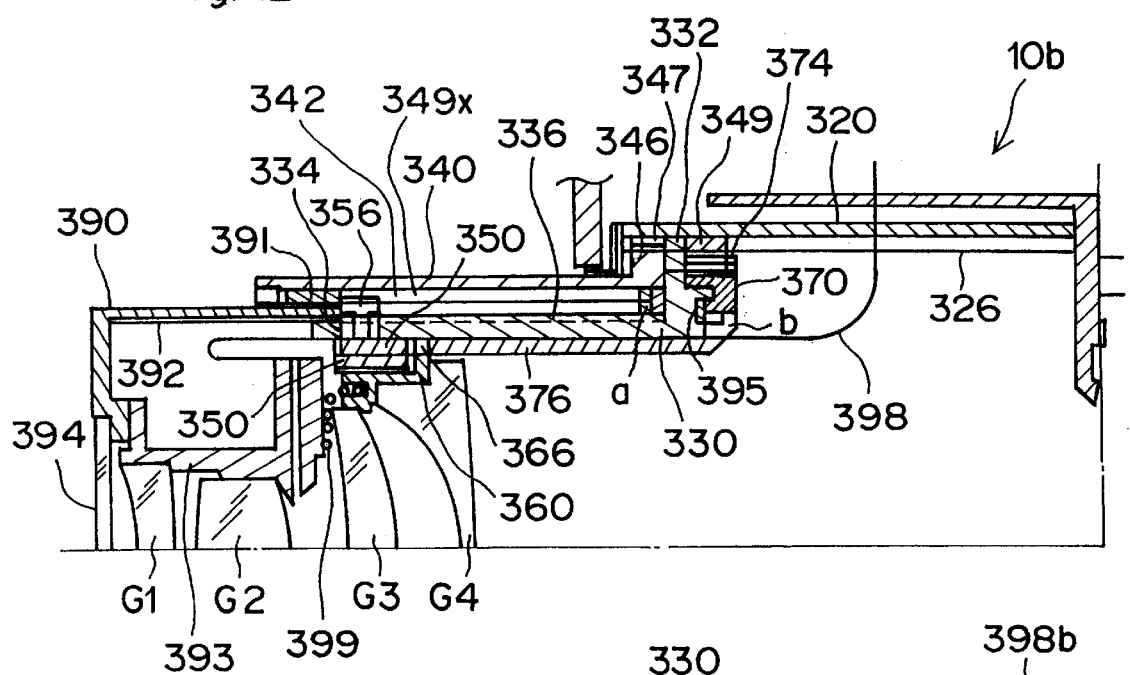
FIG. 12 is a longitudinal sectional view showing a zoom lens barrel in which a movable cylinder thereof is in a tele-end, which is installed in a camera body, according to a third embodiment of the present invention.
Figure 13:
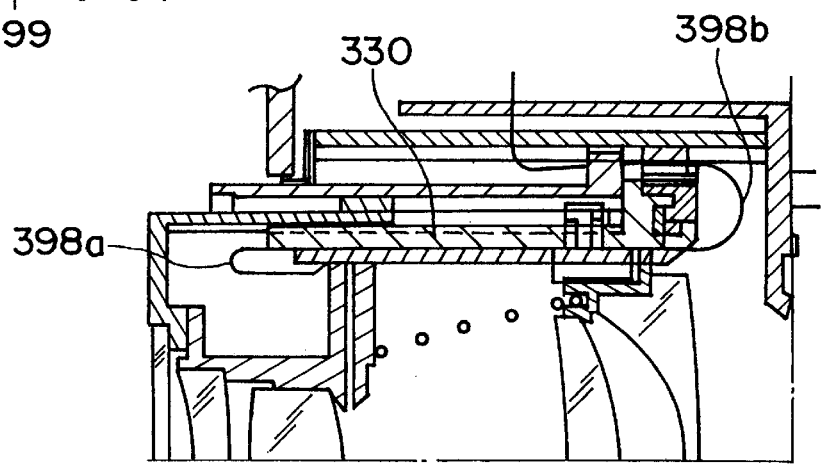
FIG. 13 is a longitudinal sectional view showing the zoom lens barrel shown in FIG. 12 in which the movable cylinder thereof is in a wide-end.
Figure 14:
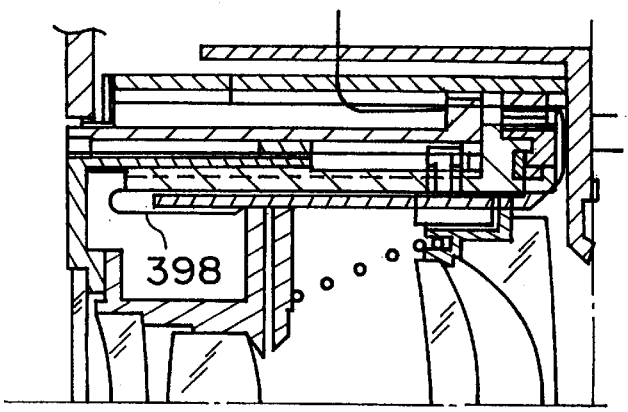
FIG. 14 is a longitudinal sectional view showing the zoom lens barrel shown in FIG. 12 in which the movable cylinder thereof is fully collapsed inside the fixed cylinder thereof.

In the third embodiment, the construction of the zoom lens barrel of the first or the second embodiment applies to a lens barrel in which a movable cylinder is constructed to be moved out from a fixed cylinder in two steps or stages. FIG. 12 illustrates a condition in which the zoom lens barrel 10b is in a tele-end; FIG. 13 illustrates a condition in which the zoom lens barrel 10b is in a wide-end; and FIG. 14 illustrates a condition in which the movable cylinder is completely collapsed inside the fixed cylinder.

Similar to the first embodiment, when a driving cylinder 370 of a zoom lens barrel 10b is driven by a lens-driving long gear 314 (see FIG. 15), the rotation of the driving cylinder 370 is transmitted to a rotation cylinder 340 with a predetermined interval or play. That is, there is provided the predetermined interval or play in the rotational direction between the driving cylinder 370 and the rotation cylinder 340. And, the focusing operation is performed utilizing the idling interval i.e. when the driving cylinder 370 rotates relative to the rotation cylinder over the idling interval, the operation of which is similar to the operation of the first embodiment.

When the driving cylinder 370 rotates to an end (i.e. terminal end) of the idling interval, the rotation cylinder 340 also rotates together with the driving cylinder 370.

The rotation cylinder 340 is connected to a fixed cylinder 320 by means of a lead. The rotation cylinder 340 is connected to a linear-moving cylinder 330 by a bayonet, and the linear-moving cylinder 330 is connected to a driving cylinder 370 by a bayonet. With the mechanism, the rotation cylinder 340 moves back and forth along the optical axis together with both the linear-moving cylinder 330 and the driving cylinder 370.

The linear-moving cylinder 330 is guided to move straight along the optical axis by cooperating with the fixed cylinder 320, and the linear-moving cylinder 330 thus moves linearly along the optical axis without rotation relative to the fixed cylinder 320.

A first component lens shutter unit 393 is installed on a forward-moving cylinder 390. The forward-moving cylinder 390 is connected to the rotation cylinder 340 by a helicoid and is guided to move straight by cooperating with the linear-moving cylinder 330. With the construction, when the rotation cylinder 340 moves forward and backward along the optical axis while it is rotating relative to the fixed cylinder 320, the forward-moving cylinder 390 also moves forward and backward along the optical axis relative to the rotation cylinder 340 without rotation relative to the fixed cylinder 320. With the movement of the forward-moving cylinder 390 relative to the rotation cylinder 340, and therefore, with the movement of the forward-moving cylinder 390 relative to the fixed cylinder 320, the first component lens shutter unit 393 is moved to a predetermined position, necessary for performing the zooming operation, relative to the fixed cylinder 320.

On the other hand, a second component zoom frame 350 is connected to the rotation cylinder 340 by a key, and the second component zoom frame 350 is connected to the linear-moving cylinder 330 by a cam. With the construction, the second component zoom frame 350 is moved forward and backward, in the optical direction of lenses with the second component zoom frame 350 rotating together with the rotation cylinder 340 relative to the fixed cylinder 320 while the rotation cylinder 340 rotates relative thereto. With the movement of the second component zoom frame 340 relative to the fixed cylinder 320, the second component zoom frame 350 is moved to a position necessary for performing the zooming operation.

Because the zoom lens barrel 10b according to the third embodiment has many constructions similar to that of the zoom lens barrel 10 according to the first embodiment, the constructions different from those of the first embodiment are mainly described below.

Figure 16:
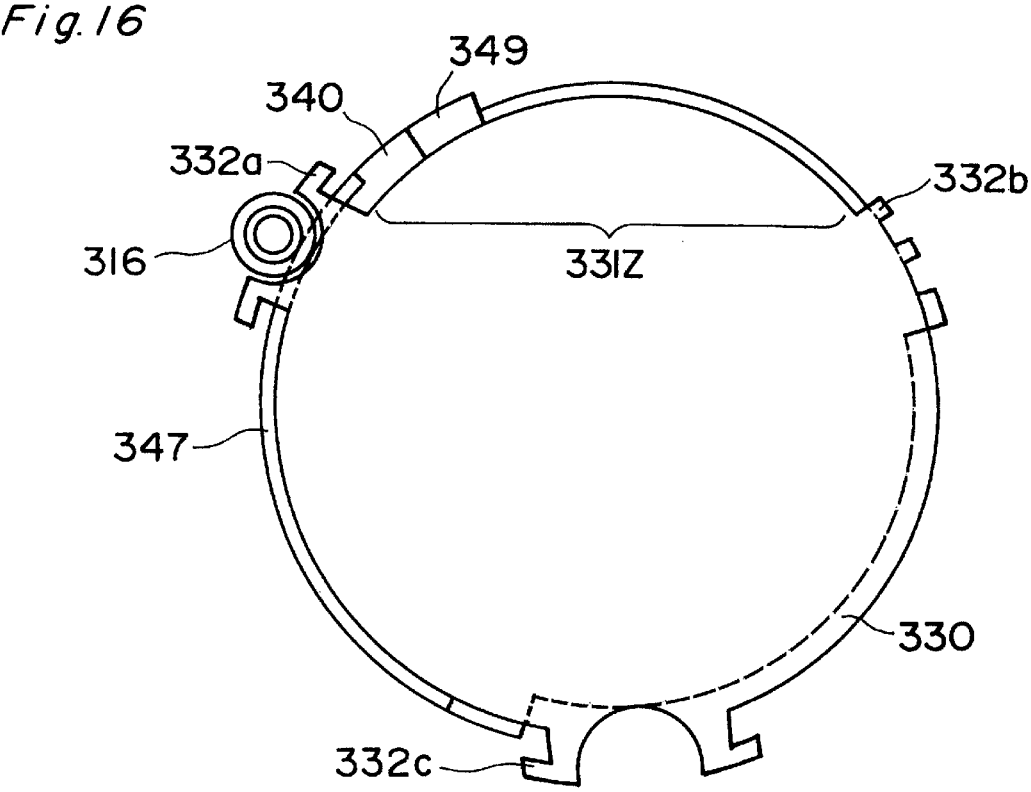
FIG. 16 is a view showing a part of the zoom lens barrel, shown in FIG. 12, from a film side in a direction along the optical axis.

A lead 326 and an unshown linear guide are provided on the inner peripheral surface of the fixed cylinder 320. The lead 326 of the fixed cylinder 320 engages a lead connection portion 346 provided on a rear end of the rotation cylinder 340; and the unshown linear guide of the fixed cylinder 320 engages an engaging projection 332 formed on a rear end of the linear-moving cylinder 330. In FIG. 16, the engaging projection 332 is shown as 332a, 332b, and 332c.

The rotation cylinder 340 and the linear-moving cylinder 330 are connected with each other by the bayonet "a", and the linear-moving cylinder 330 and the driving cylinder 370 are connected with each other by the bayonet "b". With the construction, the linear-moving cylinder 330, the rotation cylinder 340, and the driving cylinder 370, are rotatably connected with one another, and can be moved along the optical axis together.

A reinforcing plate 395 is sandwiched between the linear-moving cylinder 330 and the driving cylinder 370; thus, preventing the linear-moving cylinder 330 from being deformed by the driving force exerting therebetween.

Figure 15:
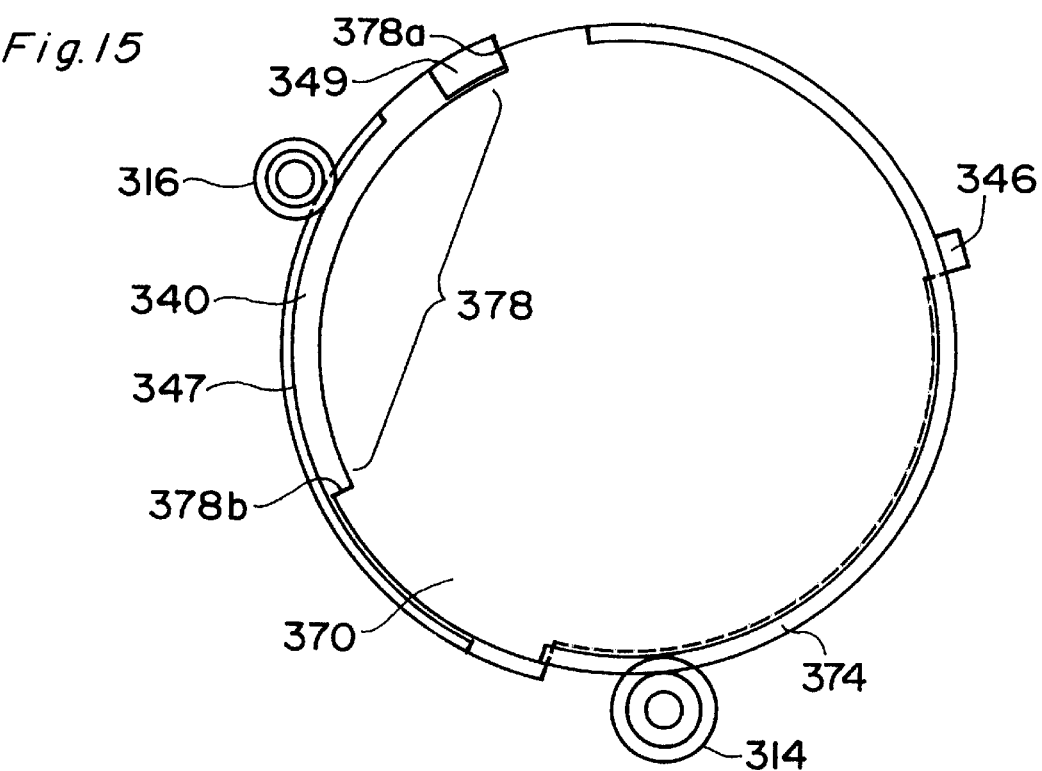
FIG. 15 is a view showing a part of the zoom lens barrel, shown in Fi 12, from a film side in a direction along the optical axis.

There is provided a driving gear 374 at a rear end of the driving cylinder 370, and the driving gear 374 is engaged with the lens-driving long gear 314, as shown in FIG. 15. The lens-driving long gear 374 is rotatably held by the fixed cylinder 320, the construction of which is similar to the first embodiment. The lens-driving long gear 314 is driven by an unshown motor provided inside the camera body.

There is provided a finder-interlocking gear 347 at a rear end of the rotation cylinder 340, and the gear 347 is interlocked with a zooming mechanism of the view finder. The construction thereof is similar to the construction of the first embodiment.

There is provided a zoom rotation transmission key 349 on the rear end of the rotation cylinder 340. On the other hand, there is provided an idling groove 378 on a part of peripheral surface of the driving cylinder 370. The idling groove 378 of the driving cylinder 370 serves as a predetermined play (idling field or idling region) between the driving cylinder 370 and the rotation cylinder 340 in a direction of mutual rotation therebetween. That is, when the driving cylinder 370 rotates relative to the fixed cylinder 320, and when either of end surfaces, corresponding to either ends of the idling groove 378, of the driving cylinder 370 contacts the zoom rotation transmission key 349 of the rotation cylinder 340, the rotation of the driving cylinder 370 is transmitted to the zoom rotation transmission key 349, i.e. to the rotation cylinder 340.

Also, there is provided a driving gear 374 around the peripheral surface of the driving gear 374, as shown in FIG. 15.

FIG. 16 shows a relationship between the linear-moving cylinder 330 and the zoom rotation transmission key 349 of the rotation cylinder 340. As shown in FIGS. 12, 13, and 14, the zoom rotation transmission key 349 projects from the rear end of the rotation cylinder 340 toward the driving cylinder 370 so as to sandwich the linear-moving cylinder 330 thereby. The linear-moving cylinder 330 and the zoom rotation transmission key 349 do not interfere with each other because the zoom rotation transmission key 349 moves, in the zooming operation, within a limited arc 331Z, as shown in FIG. 16, which is formed on a part of peripheral surface of the linear-moving cylinder 330.

As shown in FIGS. 12, 13, and 14, there are provided a helicoid 349x and a zoom rotation transmission key groove 342 on an inner peripheral surface of the rotation cylinder 340. The helicoid 349X engages a helicoid connection portion 391 provided at a rear end of the forward-moving cylinder 390; and the zoom rotation transmission key groove 342 engages a cam pin 356 of the second component zoom frame 350.

There is provided a linear movement transmission key 336 on a peripheral surface of the linear-moving cylinder 330, and the key 336 engages a linear engaging key 392 formed on an inner peripheral surface of the forward-moving cylinder 390. Also, there is provided a second component zoom cam hole 334 on the linear-moving cylinder 330, and the cam hole 334 engages a cam pin 356 of the second component zoom frame 350. There is provided a protection glass 394 and the first component lens shutter unit 393 on the forward-moving cylinder 390.

Second component lenses G3 and G4 are held by a second lens frame 360. An outer helicoid is formed on the peripheral surface of the second component zoom frame 360, and the outer helicoid of the second component zoom frame 360 engages an inner helicoid formed on an inner surface of the second component zoom frame 350.

There is provided a focus rotation transmission portion 366 on the second lens frame 360, and the focus rotation transmission portion 366 is connected with a focus rotation transmission key 376 of the driving cylinder 370. With the construction, the rotation of the driving cylinder 370 is transmitted to the second lens frame 360.

Figure 17:
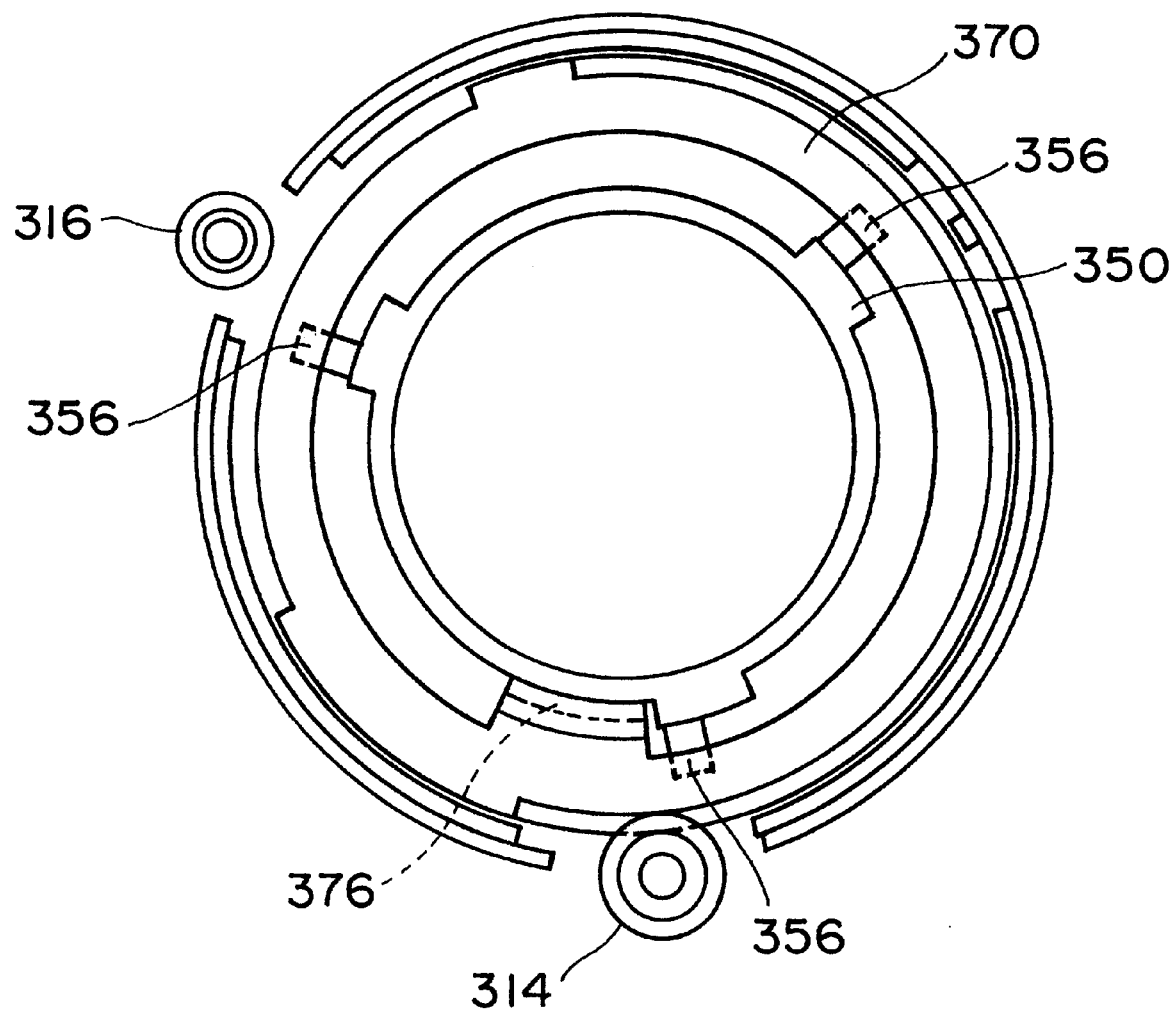
FIG. 17 is a view showing a part of the zoom lens barrel, shown in FIG. 12, from a film side in a direction along the optical axis.

FIG. 17 shows a relationship between the focus rotation transmission key 376 and the second component zoom frame 350. In the focusing operation, the focus rotation transmission key 376 rotates between the adjacent cam pins 356, whereas in the zooming operation, the focus rotation transmission key 376 rotates together with the cam pins 356. Therefore, the focus rotation transmission key 376 does not interfere with the cam pins 356. One focus rotation transmission key 376 is provided in the third embodiment as shown in FIG. 17, but two or three focus rotation transmission keys 376 may be provided.

As shown in FIGS. 12, 13, and 14, a second component urging spring 399 is provided between the first component lens shutter unit 393 and the second lens frame 360 to urge the second component, namely, the second lens frame 360 rearward and to prevent the helicoid and the cams from becoming loose so that the focusing operation can be performed with high accuracy.

An intermediate part of a flexible printed circuit board 398 for driving the shutter is fixed to the linear-moving cylinder 330. The flexure, which occurs in the zooming operation, of the front part 398a of the flexible board 398 is absorbed in a space which is located alongside the first component lens shutter unit 393, whereas the flexure, which occurs in the zooming operation, of the rear part 398b of the flexible board 398 is absorbed in a space which is located rearward of the linear-moving cylinder 330 and inside the fixed cylinder 320. The position of the flexible printed wiring board 398 relative to the fixed cylinder 320 is out of the rotatable range of the focus rotation transmission key 376 relative thereto; therefore, the flexible board 398 does not interfere with the focus rotation transmission key 376.

Next, the operation of the zoom lens barrel 10b will be described below.

First, the operation of the zoom lens barrel 10b in the zooming operation is described below.

When the driving cylinder 370 is driven to be rotated by the lens-driving long gear 314, and the rotation cylinder 340 is driven to be rotated by the zoom rotation transmission key 349, the rotation cylinder 340 is moved along the optical axis with the rotation cylinder 340 engaging the fixed cylinder 320 through a lead. At this time, the linear-moving cylinder 330 which is connected with the rotation cylinder 340 by the bayonet, and the driving cylinder 370 which is connected with the linear-moving cylinder 340 by the bayonet, are moved together. In addition, the forward-moving cylinder 390 is moved, without being rotated relative to the fixed cylinder 320, linearly along the optical axis relative to the rotation cylinder 340, in a state in which the forward-moving cylinder 390 is guided by the linear-moving cylinder 330 and in which the forward-moving cylinder 390 engages the rotation cylinder 340 with the helicoid. In accordance with the movement of the forward-moving cylinder 390, the first component lens shutter unit 393 also moves along the optical axis.

The second component zoom frame 350 rotates together with the rotation cylinder 340, and the second component zoom frame 350 is moved along the optical axis by the cam of the linear-moving cylinder 330. Also, because the second lens frame 360 is rotated together with the second component zoom frame 350 by the focus rotation transmission key 376 of the driving cylinder 370, a positional relationship between the helicoid of the second component zoom frame 350 and that of the second lens frame 360, remains constant, or is not changed.

At this time, the first component lenses G1 and G2, and the second component lenses G3 and G4, are moved together, in a state in which a predetermined optical relationship therebetween, which is required to perform the zooming operation is surely kept.

Meanwhile, when the rotation of the driving cylinder 370 is reversed after the zooming operation is completed, the rotation of the driving cylinder 370 is not transmitted to the rotation cylinder 340 by the idling groove 378 formed on the driving cylinder 370, so that the rotation cylinder 340 does not rotate. As a result of this, the zooming operation is not performed. However, the rotation of the driving cylinder 370 is transmitted to the second lens frame 360 via the focus rotation transmission key 376, so that the second lens frame 360 is rotated. At this time, because the second component zoom frame 350 remains stationary, the second lens frame 360 moves along the optical axis by the connection between the helicoid of the second component zoom frame 350 and that of the second lens frame 360, thus performing the focusing operation.

The detailed operation, control, and the interlocking with the view finder in unison with the rotation of the rotation cylinder (rotary cylinder) 340, etc. are similar to those in the first and second embodiments.

Alternatively, it is possible to apply the construction of the zoom lens barrel 10b of the third embodiment, the movable lens barrel of which is constructed to be of a type in which it is moved forward and backward in the optical direction in two steps or stages as mentioned above, to the construction of the first or the second embodiment mentioned above.

Alternatively, the zoom lens barrel may be constructed to be moved out from the fixed cylinder in three or more steps or stages.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A zoom lens barrel, comprising:
    a zoom driving system comprising a focus driving system, the focus driving system comprising a first lens group, said zoom driving system further comprising a second lens group;
    a first transmission mechanism for transmitting a driving force from an outside driving source to the focus driving system; and
    a second transmission mechanism, which allows a predetermined play between the zoom driving system and the first transmission mechanism, for transmitting the driving force of the first transmission mechanism to the second lens group when the play is absorbed between the first transmission mechanism and the zoom driving system,
    wherein the focus driving system as a whole and the second lens group move relative to each other for a zooming operation,
    wherein only the focus driving system is driven by the driving force of the first transmission mechanism when the play is not absorbed between the first transmission mechanism and the zoom driving system, so that the first lens group is moved for focusing operation, and
    wherein the zoom driving system is driven by the driving force of the first transmission mechanism when the play is absorbed between the first transmission mechanism and the zoom driving system, so that the focus driving system as a whole and the second lens group are moved for the zooming operation.

2. The zoom lens barrel as claimed in claim 1, wherein the focus driving system further comprises:
    a lens frame holding the first lens group therein; and
    a cylindrical zooming frame holding the lens frame movably therein,
    wherein the lens frame is rotated by the first transmission mechanism,
    wherein the cylindrical zooming frame is moved during the zooming operation,
    wherein the lens frame and the cylindrical zooming frame engage each other with a helicoid connection, and wherein the zooming frame of the focus driving system is rotated in a same rotational direction and with a same rotational amount as the lens frame thereof which is rotated by the first transmission mechanism when the driving force is transmitted from the first transmission mechanism to the zoom driving system via the second transmission mechanism.

3. The zoom lens barrel as claimed in claim 1, wherein the second lens group is provided between an object to be photographed and the first lens group.

4. The zoom lens barrel as claimed in claim 1, which further comprises a shutter mechanism between the first lens group and the second lens group.

5. The zoom lens barrel as claimed in claim 1, wherein the zoom driving system further comprises a finder driving transmission mechanism for transmitting the driving force from the first transmission mechanism to a finder mechanism when the zoom driving system is driven by the first transmission mechanism.

6. An optical mechanism, comprising:
a motor;
a first moving member holding a first optical component;
a second moving member holding a second optical component;
a first transmission member driven by a driving force from the motor;
a second transmission member engaging the first transmission member with a predetermined play between the first transmission member and the second transmission member;
a first moving mechanism for moving the first moving member along an optical axis by a relative movement between the first transmission member and the second transmission member; and
a second moving mechanism for moving the second moving member along the optical axis when the play does not exist between the first transmission member and the second transmission member, so that the second transmission member is driven by the first transmission member.

7. The optical mechanism as claimed in claim 6, wherein the first moving mechanism is moved together with the first moving member by the second moving mechanism.

8. The optical mechanism as claimed in claim 6, wherein a displacement of the first moving member along the optical axis by the first moving mechanism for a constant rotational amount of the motor is different from a displacement of the first moving member along the optical axis by the second moving mechanism for the constant rotational amount of the motor.

9. A zoom lens barrel, comprising:
a zoom driving system comprising a focus driving system, the focus driving system comprising a first lens group, said zoom driving system further comprising a second lens group;
a first transmission mechanism for transmitting a driving force from an outside driving source to the focus driving system during a focusing operation and a zooming operation; and
a second transmission mechanism, which allows a predetermined play between the second lens group and the first transmission mechanism, for transmitting the driving force of the first transmission mechanism to the second lens group when the play is absorbed between the second lens group and the first transmission mechanism.

10. A zoom lens barrel, comprising:
a zoom driving system comprising a focus driving system, the focus driving system comprising a first lens group, said zoom driving system further comprising a second lens group;

a first transmission mechanism for transmitting a driving force from an outside driving source to the focus driving system;
a predetermined play between the zoom driving system and the first transmission mechanism; and
a second transmission mechanism for transmitting the driving force of the first transmission mechanism to the zoom driving system when the play is absorbed between the zoom driving system and the first transmission mechanism.

11. A zoom lens barrel, comprising:
a zoom driving system comprising a focus driving system, the focus driving system comprising a first lens group, said zoom driving system further comprising a second lens group;
a first transmission mechanism for transmitting a driving force from an outside driving source to the focus driving system;
a second transmission mechanism, which allows a predetermined play between the zoom driving system and the first transmission mechanism, for transmitting the driving force of the first transmission mechanism to the zoom driving system when the play is absorbed between the zoom driving system and the first transmission mechanism; and
a finder driving transmission mechanism for transmitting the driving force from the first transmission mechanism to a finder mechanism,
wherein only the focus driving system is driven by the driving force of the first transmission mechanism when the play is not absorbed between the zoom driving system and the first transmission mechanism, and
wherein the zoom driving system and the finder driving transmission mechanism are driven by the driving force of the first transmission mechanism when the play is absorbed between the zoom driving system and the first transmission mechanism.

12. A zoom lens barrel, comprising:
a zoom driving system comprising a focus driving system, the focus driving system comprising a first lens group, said zoom driving system further comprising a second lens group;
a first transmission mechanism for transmitting a driving force from an outside driving source to the focus driving system;
a second transmission mechanism, which allows a predetermined play between the zoom driving system and the first transmission mechanism, for transmitting the driving force of the first transmission mechanism to the zoom driving system when the play is absorbed between the zoom driving system and the first transmission mechanism; and
a third transmission mechanism, which allows a predetermined play corresponding to the play of the second transmission mechanism, for transmitting the driving force from the first transmission mechanism to a finder driving mechanism,
wherein only the focus driving system is driven by the driving force of the first transmission mechanism when the play is not absorbed between the zoom driving system and the first transmission mechanism, and
wherein the third transmission mechanism is driven by the driving force of the first transmission mechanism when the play is absorbed between the finder driving mechanism and the first transmission mechanism.

* * * * *